United States Patent [19]
Okada

[11] Patent Number: 6,159,761
[45] Date of Patent: Dec. 12, 2000

[54] METHOD OF MANUFACTURING A FORCE SENSOR HAVING AN ELECTRODE WHICH CHANGES RESISTANCE OR ELECTROSTATIC CAPACITANCE IN RESPONSE TO FORCE

[75] Inventor: Kazuhiro Okada, Ageo, Japan

[73] Assignee: Wacoh Corporation, Ageo, Japan

[21] Appl. No.: 09/054,573

[22] Filed: Apr. 3, 1998

[30] Foreign Application Priority Data

May 8, 1997 [JP] Japan .................................... 9-134361

[51] Int. Cl.[7] .......................... H01L 21/00; G01P 15/125; G01P 15/12; G01P 15/09
[52] U.S. Cl. .......................... 438/53; 438/462; 73/514.32; 73/514.33; 73/514.34
[58] Field of Search .................. 438/53, 462; 73/514.32, 73/514.33, 514.34

[56] References Cited

U.S. PATENT DOCUMENTS

| | | | |
|---|---|---|---|
| 4,905,523 | 3/1990 | Okada | 73/862.04 |
| 4,967,605 | 11/1990 | Okada | 73/862.04 |
| 4,969,366 | 11/1990 | Okada | 73/862.08 |
| 5,002,901 | 3/1991 | Kurtz et al. | 437/228 |
| 5,014,415 | 5/1991 | Okada | 29/621.1 |
| 5,035,148 | 7/1991 | Okada | 73/862.04 |
| 5,092,645 | 3/1992 | Okada | 294/86.4 |
| 5,182,515 | 1/1993 | Okada | 324/259 |
| 5,263,375 | 11/1993 | Okada | 73/862.042 |
| 5,295,386 | 3/1994 | Okada | 73/1 D |
| 5,343,765 | 9/1994 | Okada | 73/862.043 |
| 5,365,799 | 11/1994 | Okada | 73/862.041 |
| 5,392,658 | 2/1995 | Okada | 73/862.043 |
| 5,406,848 | 4/1995 | Okada | 73/517 R |
| 5,421,213 | 6/1995 | Okada | 73/862.043 |
| 5,437,196 | 8/1995 | Okada | 73/862.043 |
| 5,492,020 | 2/1996 | Okada | 73/862.626 |
| 5,497,668 | 3/1996 | Okada | 73/862.626 |
| 5,531,002 | 7/1996 | Okada | 29/25.41 |
| 5,531,092 | 7/1996 | Okada | 73/1 D |
| 5,571,972 | 11/1996 | Okada | 73/862.043 |
| 5,594,177 | 1/1997 | Ishida et al. | 73/514.32 |
| 5,639,973 | 6/1997 | Okada | 73/862.043 |
| 5,646,346 | 7/1997 | Okada | 73/504.04 |
| 5,668,318 | 9/1997 | Okada | 73/504.11 |
| 5,682,000 | 10/1997 | Okada | 73/862.043 |
| 5,744,718 | 4/1998 | Okada | 73/514.33 |

FOREIGN PATENT DOCUMENTS

| | | |
|---|---|---|
| 0479686 | 4/1992 | European Pat. Off. . |
| 9403786 | 2/1994 | WIPO . |

OTHER PUBLICATIONS

Kim, Kyu Hyun, et al. "A skew–symmetric cantilever accelerometer for automotive airbag applications." Sensors and Actuators A–Physical, A50, Nos. 1/2 (1995) pp 121–126.

Wolffenbuttel, R. F. "Integrated Micromechanical Sensors and Actuators in Silicon." Mechatronics, vol. 1, No. 4 (1991) pp 371–391.

Kniffin, Margaret L., et al. "Packaging for Silicon Micromachined Accelerometers." The International Journal of Microcircuits and Electronic Packaging, vol. 19, No. 1 (1996) pp 75–86.

*Primary Examiner*—Brian Dutton
*Attorney, Agent, or Firm*—Ladas & Parry

[57] ABSTRACT

A first substrate of the three layer structure composed of a lower layer portion consisting of silicon, a middle layer portion consisting of $SiO_2$ and an upper layer portion consisting of silicon is prepared. Impurity is doped into the lower layer portion so that it has conductivity. The lower surface of the lower layer portion is etched to form a diaphragm portion and a pedestal portion, and then a second substrate consisting of glass is joined to the portion therebelow. By the electrodes on the second substrate and the diaphragm portion, capacitance elements are formed. Grooves are dug by a dicing blade from the upper surface of the upper layer portion thereafter to downwardly dig the bottom portions of the grooves by etching until the upper surface of the lower layer portion is exposed. When the respective unit areas are cut off, there is obtained a structure in which a weight body is positioned at the central portion of the diaphragm portion and a pedestal is formed at the periphery thereof. Piezo resistance elements may be used in place of the capacitance elements.

41 Claims, 20 Drawing Sheets

METHOD OF MANUFACTURING A FORCE SENSOR HAVING AN ELECTRODE WHICH CHANGES RESISTANCE OR ELECTROSTATIC CAPACITANCE IN RESPONSE TO FORCE

BACKGROUND OF THE INVENTION

This invention relates to a manufacturing method for a sensor, and more particularly to a method of manufacturing a sensor in which an electrode interval of a capacitance element is changed or a mechanical deformation is induced in the piezo resistance element on the basis of force applied to a weight body by action of acceleration or angular velocity, thus making it possible to detect direction and magnitude of acceleration or angular velocity applied thereto as a change of an electrostatic capacitance or a resistance value.

In the automobile industry or the machinery industry, etc., there has been increased demand of sensors capable of precisely detecting physical action such as force, acceleration, angular velocity or magnetism. Particularly, compact sensors capable of detecting these physical actions every two-dimensional or three-dimensional components have been expected. In order to meet such demand, there are disclosed, in U.S. Pat. No. 5,492,020, U.S. Pat. No. 5,497,668, U.S. Pat. No. 5,421,213 and U.S. Pat. No. 5,406,848, a fundamental structure of the sensor capable of detecting force, acceleration or magnetism by utilizing a change of an electrostatic capacitance. Moreover, in U.S. Pat. No. 5,646,346, a sensor capable of detecting angular velocity by utilizing a change of an electrostatic capacitance is disclosed. These sensors have a function to detect, as a change of an electrostatic capacitance value, force directly applied from the external or force applied resulting from acceleration, magnetism or angular velocity. Namely, since an electrode interval of a capacitance element is changed on the basis of force applied to a weight body, the applied force can be detected as a change of the electrode interval by measuring a change of an electrostatic capacitance value of the capacitance element.

Further, in U.S. Pat. No. 4,905,523, U.S. Pat. No. 4,969,366, U.S. Pat. No. 4,967,605, U.S. Pat. No. 5,182,515, U.S. Pat. No. 5,092,645, and U.S. Pat. No. 5,263,375, etc., sensors for detecting force/acceleration/magnetism by utilizing a piezo resistance element are disclosed. In these sensors, there is employed a structure in which mechanical deformation takes place in the piezo resistance element on the basis of force applied to a weight body, and detection is carried out on the basis of a change of a resistance value of the piezo resistance element.

In order to popularize utilization of such sensors in various industrial fields, reduction in cost by mass-production is indispensable. In view of the above, e.g., in U.S. Pat. No. 5,531,002, there is disclosed a manufacturing method suitable for mass-producing three-dimensional acceleration sensors utilizing change of electrostatic capacitance. In U.S. Pat. No. 5,014,415, there is disclosed a manufacturing method suitable for mass-producing a three-dimensional acceleration sensor utilizing piezo resistance elements. These manufacturing methods utilize semiconductor processing which is widely used for manufacturing semiconductor integrated circuits. In accordance with this method, necessary processing is implemented onto a substrate surface of silicon etc., and plural substrates are stacked to constitute a substrate body having multi-layers. Then the substrate body is cut to manufacture a large number of sensors at the same time. According to this manufacturing method, a large number of sensors can be produced at low cost similarly to the manufacturing process of the typical semiconductor integrated circuit.

In accordance with the above-described manufacturing method, considerably compact sensors can be provided. In the industrial field, never the less, further miniaturization of sensor is expected. However, with the above-described conventional manufacturing method, further miniaturization on the commercial base is very difficult. Namely, in order to detect force applied to the weight body as a change of distance between electrodes which constitutes a capacitance element or to detect it as a change of resistance value of a piezo resistance element, it is necessary to produce a sensor structural body having specific physical structure. However, with the conventional typical semiconductor manufacturing process, it is very difficult to produce a fine sensor structural body.

For example, in order to quarry a weight body from a single semiconductor substrate, it is necessary to dig grooves on the substrate. Especially, a thin and deep groove should be made on the substrate for realizing miniaturization. However, it is difficult to make a thin and deep groove by using an etching method generally utilized in the semiconductor manufacturing process. On the other hand, when a mechanical cutting method using a dicing blade is applied, it is possible to make a thin and deep groove on the substrate. However, this mechanical cutting method has another problem of cracking. The more the sensor structural body becomes compact, the more cracking is apt to take place on the semiconductor substrate when the mechanical processing is applied. As a result, mass-production on the commercial base becomes difficult in point of yield.

In view of the above, an object of this invention is to provide a method of manufacturing a sensor utilizing an electrostatic capacitance element or a sensor utilizing a piezo resistance element, in which mass-production of more compact sensors can be realized on the commercial base.

SUMMARY OF THE INVENTION (1) A first feature of the present invention resides in a method of manufacturing a sensor utilizing change of electrostatic capacitance wherein capacitance elements are manufactured on a pair of substrates, the method comprising:

a step of preparing a first substrate where a working area is defined at a central portion thereof, a flexible area is defined at a periphery of the working area and a fixed area is defined at a periphery of the flexible area, and preparing a second substrate for being disposed in a manner opposite to a lower surface of the first substrate;

a step of implementing processing to either the lower surface of the first substrate or an upper surface of the second substrate, or both of the surfaces so that a cavity portion for capacitance element can be formed between said working and flexible areas of the first substrate and an opposite area of the second substrate;

a step of providing electrodes so that capacitance elements can be formed between a surface of the first substrate constituting an upper wall surface of said cavity portion for capacitance element and a surface of the second substrate constituting a lower wall surface of said cavity portion for capacitance element;

a step of joining the lower surface of the fixed area of the first substrate to the upper surface of the second substrate so as to form said cavity portion for capacitance element and said capacitance elements;

a step of digging a portion of at least the flexible area of the first substrate from the upper surface to thereby form grooves having a first depth; and a step of implementing etching to bottom portions of the grooves until their depths reach a second depth so that a flexible portion is formed by a portion of the flexible area of the first substrate, a weight body is formed by a portion of the working area of the first substrate and a pedestal is formed by a portion of the fixed area of the first substrate thus to form a sensor structural body wherein bending takes place in the flexible portion on the basis of force applied to the weight body;

to manufacture a sensor having a function to measure physical action on the basis of change of electrostatic capacitance values of the capacitance elements.

(2) A second feature of the present invention resides in a method according to the first feature wherein the method further comprising:

a step of preparing a third substrate for being disposed in a manner opposite to the upper surface of the first substrate; and a step of joining an upper surface of the pedestal to a lower surface of the third substrate in the state where a space is provided between the pedestal and the third substrate, the weight body being permitted to undergo displacement with a predetermined degree of freedom within said space.

(3) A third feature of the present invention resides in a method of manufacturing a sensor utilizing change of electrostatic capacitance, the method comprising:

a step of preparing a first substrate where a working area is defined at a central portion thereof, a flexible area is defined at a periphery of the working area and a fixed area is defined at a periphery of the flexible area, and preparing a second substrate for being disposed in a manner opposite to a lower surface of the first substrate;

a step of implementing processing to either the lower surface of the first substrate or an upper surface of the second substrate, or both of the surfaces so that a cavity portion for capacitance element can be formed between said working and flexible areas of the first substrate and an opposite area of the second substrate;

a step of providing electrodes so that capacitance elements can be formed between a surface of the first substrate constituting an upper wall surface of said cavity portion for capacitance element and a surface of the second substrate constituting a lower wall surface of said cavity portion for capacitance element;

a step of joining the lower surface of the fixed area of the first substrate to the upper surface of the second substrate so as to form said cavity portion for capacitance element and said capacitance elements;

a step of digging the fixed area and the flexible area of the first substrate from the upper surface to thereby form grooves having a first depth; and a step of implementing etching to bottom portions of the grooves until their depths reach a second depth so that a flexible portion is formed by a portion of the flexible area of the first substrate and a weight body is formed by a portion of the working area of the first substrate thus to form a sensor structural body wherein bending takes place in the flexible portion on the basis of force applied to the weight body;

to manufacture a sensor having a function to measure physical action on the basis of change of electrostatic capacitance values of the capacitance elements.

(4) A fourth feature of the present invention resides in a method according to the third feature wherein the method further comprising:

a step of preparing a third substrate, a cavity portion for weight body being provided on a lower surface of said third substrate for forming a space within which the weight body is permitted to undergo displacement with a predetermined degree of freedom; and a step of joining the lower surface of the third substrate to the fixed area of an upper surface of the first substrate so as to cover the weight body by a wall surface of said cavity portion for weight body.

(5) A fifth feature of the present invention resides in a method according to the fourth feature:

wherein the cavity portion for capacitance element and the cavity portion for weight body have a structure which can be sealed from an external and both the cavity portions are sealed while carrying out vacuum suction.

(6) A sixth feature of the present invention resides in a method according to the first to the fifth features:

wherein etching is implemented to either the lower surface of the first substrate or the upper surface of the second substrate to thereby carry out processing for forming the cavity portion for capacitance element.

(7) A seventh feature of the present invention resides in a method according to the first to the sixth features:

wherein a lower layer portion of the first substrate is constituted by conductive layer and the cavity portion for capacitance element is provided in said lower layer portion so that an upper wall surface of said cavity portion for capacitance element has conductivity to constitute an electrode of the capacitance elements by said upper wall surface.

(8) An eighth feature of the present invention resides in a method according to the seventh feature:

wherein a substrate having three layer structure of an upper layer portion, a middle layer portion and a lower layer portion is used as the first substrate, and the middle layer portion is constituted by material having an etching characteristic different from that of the upper layer portion and the lower layer portion;

wherein grooves shallower than a thickness of the upper layer portion are dug as the grooves of the first depth; and wherein when the bottom portions of the grooves formed on the upper layer portion are dug to the second depth, two stages of a former stage and a latter stage are carried out so that the upper layer portion is dug by using first etching liquid or gas in the former stage and the middle layer portion is dug by using second etching liquid or gas in the latter stage.

(9) A ninth feature of the present invention resides in a method according to the eighth feature:

wherein, after the cavity portion for capacitance element is formed on the lower layer portion, a portion of the upper wall surface of the cavity portion for capacitance element is further removed by etching so as to form a slit penetrated through the lower layer portion to allow the flexible portion to have sufficient flexibility in measurement.

(10) A tenth feature of the present invention resides in a method according to the eighth or the ninth feature:

wherein the upper layer portion is constituted by silicon, the middle layer portion is constituted by silicon compound, and the lower layer portion is constituted by silicon having conductivity by addition of impurity.

(11) An eleventh feature of the present invention resides in a method according to the eighth to the tenth features:

wherein the middle layer portion is constituted by insulating material.

(12) A twelfth feature of the present invention resides in a method of manufacturing a sensor utilizing piezo resistance elements wherein a flexible substrate is prepared on which the piezo electric elements are provided, the method comprising:

a step of preparing a body substrate wherein a working area is defined at a central portion, a flexible area is defined at a periphery of the working area, and a fixed area is defined at a periphery of the flexible area;

a step of forming piezo resistance elements in the flexible area on a lower surface of the body substrate so that resistance values of said piezo resistance elements change on the basis of mechanical deformation;

a step of digging a portion of at least the flexible area of the body substrate from an upper surface to thereby form grooves having a first depth; and a step of implementing etching to bottom portions of the grooves until their depths reach a second depth so that a flexible portion is formed by a portion of the flexible area of the body substrate, a weight body is formed by a portion of the working area of the body substrate and a pedestal is formed by a portion of the fixed area of the body substrate thus to form a sensor structural body wherein bending takes place in the flexible portion on the basis of force applied to the weight body;

to manufacture a sensor having a function to measure physical action on the basis of change of resistance values of the piezo resistance elements.

(13) A thirteenth feature of the present invention resides in a method according to the twelfth feature wherein the method further comprising:

a step of preparing a cover substrate for being disposed in a manner opposite to the upper surface of the body substrate; and a step of joining an upper surface of the body substrate to a lower surface of the cover substrate in the state where a space is provided between the upper surface of the body substrate and the lower surface of the cover substrate, the weight body being permitted to undergo displacement with a predetermined degree of freedom within said space.

(14) A fourteenth feature of the present invention resides in a method of manufacturing a sensor utilizing piezo electric elements, the method comprising:

a step of preparing a body substrate wherein a working area is defined at a central portion, a flexible area is defined at a periphery of the working area, and a fixed area is defined at a periphery of the flexible area;

a step of forming piezo resistance elements in the flexible area on a lower surface of the body substrate so that resistance values of said piezo resistance elements change on the basis of mechanical deformation;

a step of digging the fixed area and the flexible area of the body substrate from an upper surface to thereby form grooves having a first depth; and a step of implementing etching to bottom portions of the grooves until their depths reach a second depth so that a flexible portion is formed by a portion of the flexible area of the body substrate and a weight body is formed by a portion of the working area of the body substrate thus to form a sensor structural body wherein bending takes place in the flexible portion on the basis of force applied to the weight body;

to manufacture a sensor having a function to measure physical action on the basis of change of resistance values of the piezo resistance elements.

(15) A fifteenth feature of the present invention resides in a method according to the fourteenth feature wherein the method further comprising:

a step of preparing a cover substrate, a cavity portion for weight body being provided on a lower surface of said cover substrate for forming a space within which the weight body is permitted to undergo displacement with a predetermined degree of freedom; and a step of joining the lower surface of the cover substrate to the fixed area of an upper surface of the body substrate so as to cover the weight body by a wall surface of said cavity portion for weight body.

(16) A sixteenth feature of the present invention resides in a method according to the twelfth to the fifteenth features wherein the method further comprising:

a step of preparing a supporting substrate for being disposed in a manner opposite to the lower surface of the body substrate;

a step of implementing processing to either the lower surface of the body substrate or an upper surface of the supporting substrate, or both of the surfaces so that a cavity portion for resistance element can be formed between said working and flexible areas of the body substrate and an opposite area of the supporting substrate; and a step of joining the lower surface of the fixed area of the body substrate to the upper surface of the supporting substrate so as to form said cavity portion for resistance element.

(17) A seventeenth feature of the present invention resides in a method according to the twelfth to the sixteenth features:

wherein a substrate having three layer structure of an upper layer portion, a middle layer portion and a lower layer portion is used as the body substrate, and the middle layer portion is constituted by material having an etching characteristic different from that of the upper layer portion and the lower layer portion;

wherein grooves shallower than a thickness of the upper layer portion are dug as the grooves of the first depth; and wherein when the bottom portions of the grooves formed on the upper layer portion are dug to the second depth, two stages of a former stage and a latter stage are carried out so that the upper layer portion is dug by using first etching liquid or gas in the former stage and the middle layer portion is dug by using second etching liquid or gas in the latter stage.

(18) An eighteenth feature of the present invention resides in a method according to the seventeenth feature:

wherein the piezo resistance elements are to be provided in the lower layer portion and there is further provided a step of removing by etching a portion of an area where the piezo resistance elements are not formed of the lower layer portion so as to form a slit penetrated through the lower layer portion to allow the flexible portion to have sufficient flexibility in measurement.

(19) A nineteenth feature of the present invention resides in a method according to the seventeenth or the eighteenth feature:

wherein the upper layer portion and the lower layer portion are constituted by silicon, the middle layer portion is constituted by silicon oxide and the piezo resistance elements are constituted by silicon having conductivity by addition of impurity.

(20) A twentieth feature of the present invention resides in a method according to the first to the nineteenth features:

wherein plural unit areas are defined on the first substrate or the body substrate, and a working area, a flexible area and a fixed area are defined for the respective unit areas, at a central portion of the unit area, at a periphery of the working area and at a periphery of the flexible area; and wherein individual steps are executed for the respective unit areas to form respectively independent sensor structural bodies in the respective unit areas thereafter to cut the substrates into the respective unit areas so as to manufacture plural independent sensors.

(21) A twenty first feature of the present invention resides in a method according to the twentieth feature:

wherein when the grooves having the first depth are dug, grooves continuous over the plural unit areas are dug.

(22) A twenty second feature of the present invention resides in a method according to the first to the twenty first features:

wherein the grooves having the first depth are formed by mechanically digging the upper surface of the first substrate.

DESCRIPTION OF THE PREFERRED EMBODIMENTS

This invention will be described below in accordance with preferred embodiments shown.

§1 Sensor Utilizing Change of Electrostatic Capacitance

Figure 1:
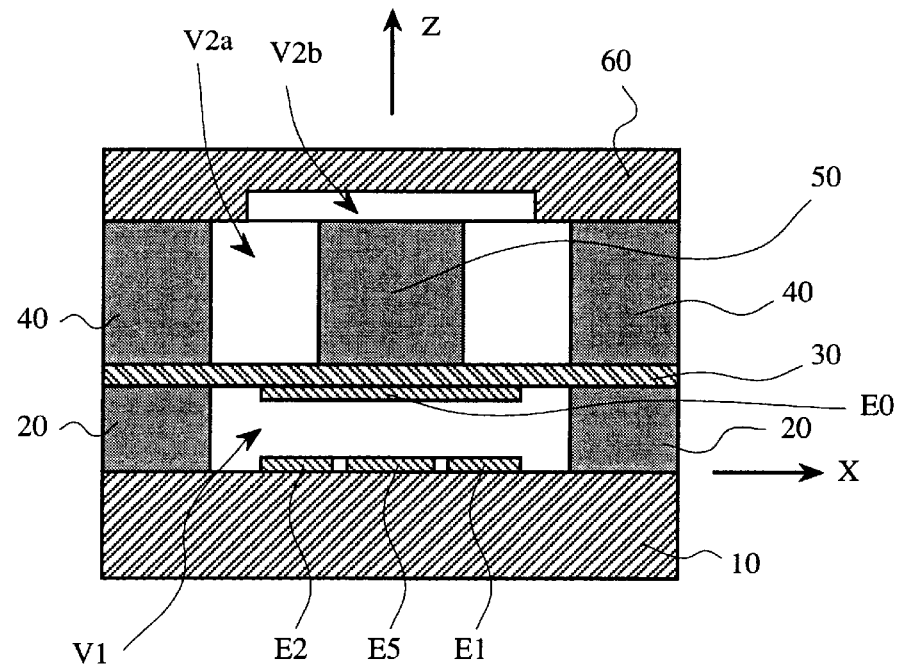
FIG. 1 is a side cross sectional view showing an example of an acceleration sensor utilizing a change of an electrostatic capacitance to which a manufacturing method according to this invention is applied.

Initially, a fundamental structure and an operation principle of a sensor utilizing change of electrostatic capacity to which this invention is applied will be described. FIG. 1 is a side cross sectional view showing an example of an acceleration sensor utilizing change of electrostatic capacity. In this sensor, a peripheral portion of a flexible substrate 30 is connected to a supporting substrate 10 through a pedestal 20. Further, on the upper surface of the flexible substrate 30, a pedestal 40 is joined at a peripheral portion and a weight body 50 is joined at a central portion. A cover substrate 60 is joined on the upper surface of the pedestal 40. Further, five lower electrodes E1 to E5 (a portion thereof is indicated in FIG. 1) are provided on the upper surface of the supporting substrate 10 and a single upper electrode E0 is provided on the lower surface of the flexible substrate 30 so that capacitance elements are constituted with both the upper and lower electrodes. A cavity portion V1 formed between the supporting substrate 10 and the flexible substrate 30 serves to ensure a space between the electrodes constituting the capacitance elements. On the other hand, a cavity portion V2a formed between the pedestal 40 and the weight body 50 and a cavity portion V2b formed between the weight body 50 and the cover substrate 60 serve to ensure such a space that the weight body 50 is permitted to undergo displacement with a predetermined degree of freedom.

The flexible substrate 30 has flexibility and the weight body 50 is supported by only this flexible substrate 30. Accordingly, when bending takes place in the flexible substrate 30, the weight body 50 can be caused to undergo displacement in an arbitrary direction. Namely, the weight body 50 is permitted to make displacement in the horizontal direction of the figure, since there is a cavity portion V2a formed at the periphery thereof. The weight body 50 is also permitted to make displacement in the lower direction of the figure, since there is a cavity portion V1 formed below, and is further permitted to make displacement in the upper direction of the figure, since there is a cavity portion V2b formed above. Let now assume that an XYZ three-dimensional coordinate system having an origin at a central portion of the upper surface of the supporting substrate 10 is defined and X-axis, Z-axis and Y-axis are defined so that they are in the right direction, in the upper direction and in the direction perpendicular to the paper surface of the figure, respectively. In addition, in the following description, it will be assumed that the cavity portion V1 within which capacitance elements are accommodated is called "cavity portion for capacitance element" and cavity portions V2a, V2b within which the weight body 50 is accommodated are called "cavity portion for weight body".

Figure 2:
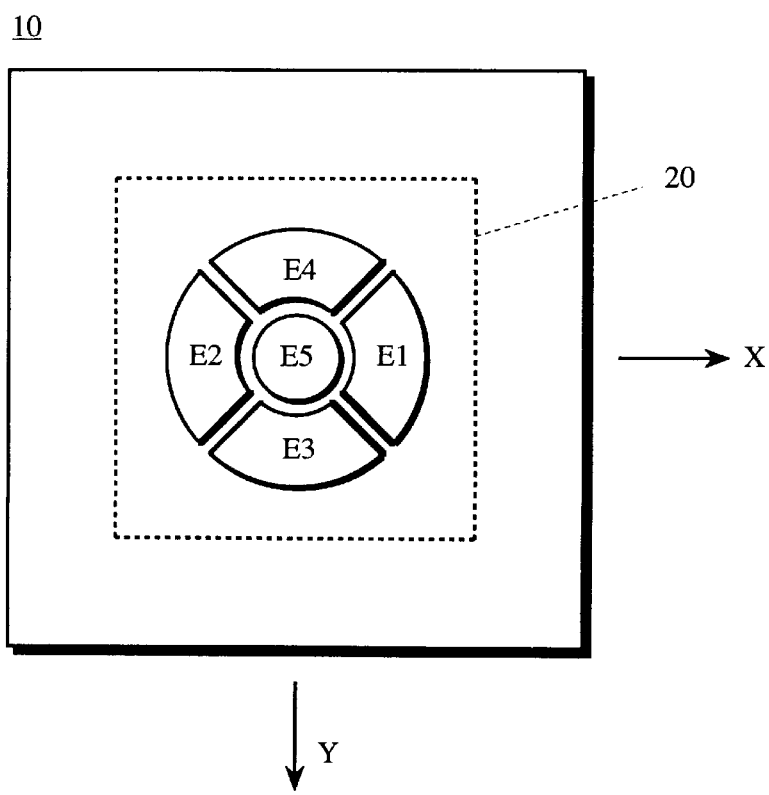
FIG. 2 is a top view of a supporting base 10 of the acceleration sensor shown in FIG. 1. The cross section cut along the X-axis of the supporting base 10 of FIG. 2 is shown in FIG. 1.

FIG. 2 is a plan view of the supporting substrate 10 of the acceleration sensor shown in FIG. 1. The cross section cut along the X-axis of the supporting substrate 10 shown in FIG. 2 is shown in FIG. 1. Moreover, broken lines of FIG. 2 indicate a position of the pedestal 20 joined on the upper surface of the supporting substrate 10. As shown in the figure, five lower electrodes E1 to E5 are formed on the supporting substrate 10. The electrodes E1, E2 are disposed on the X-axis, the electrodes E3, E4 are disposed on the Y-axis, and the electrode E5 is disposed on the origin of the three-dimensional coordinate system.

Figure 3:
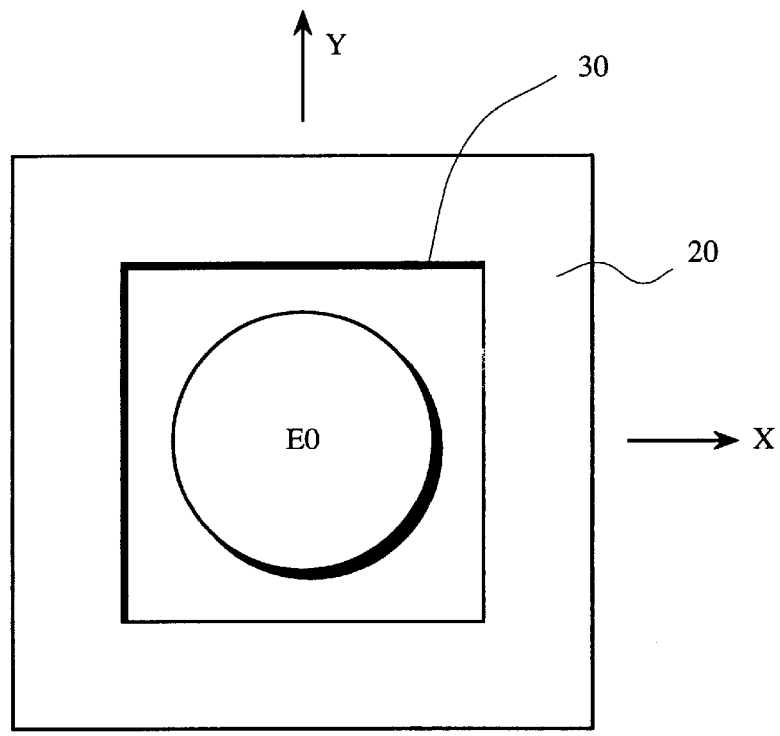
FIG. 3 is a bottom view of the state where the supporting base 10 is detached from the acceleration sensor shown in FIG. 1.

FIG. 3 is a bottom view of the state where the supporting substrate 10 is detached from the acceleration sensor shown in FIG. 1. At the central portion of the lower surface of the flexible substrate 30, a disc-shaped upper electrode E0 is formed. At the peripheral portion of the lower surface of the flexible substrate 30, the pedestal 20 is joined. The upper electrode E0 functions as a common opposite electrode with respect to the five lower electrodes E1 to E5. Accordingly, five independent capacitance elements C1, C2, C3, C4, C5 are formed by electrode pairs E1/E0, E2/E0, E3/E0, E4/E0, E5/E0 which are disposed in a manner opposite in upper and lower directions, respectively.

Figure 4:
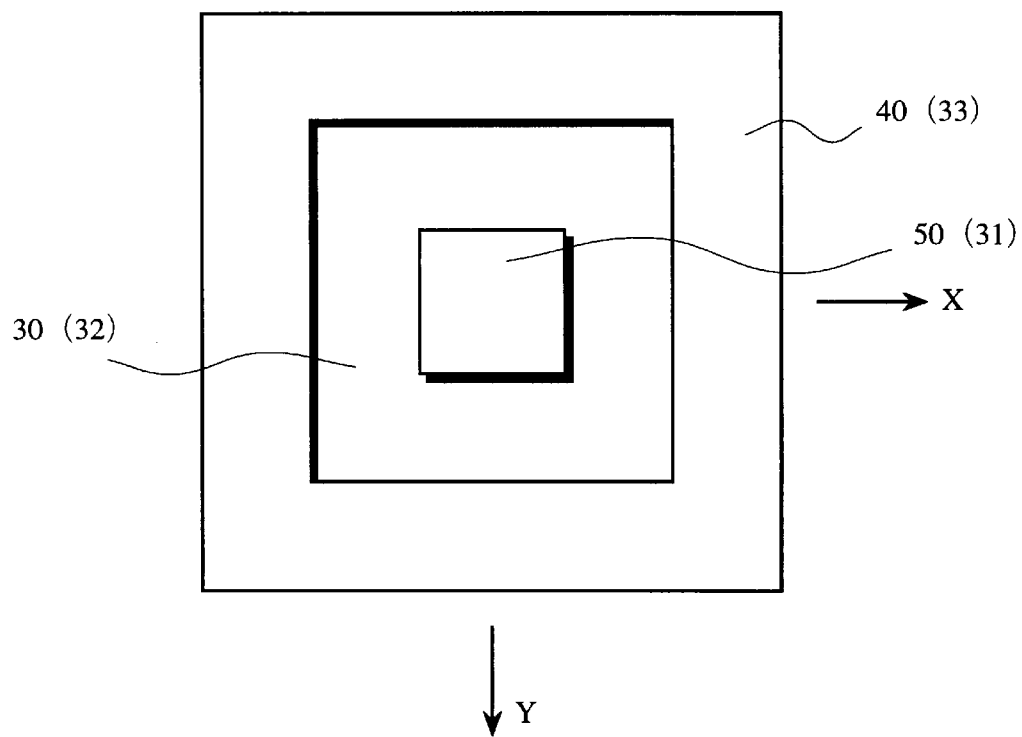
FIG. 4 is a top view of the state where a cover substrate 60 is detached from the acceleration sensor shown in FIG. 1.

FIG. 4 is a top view of the state where the cover substrate 60 is detached from the acceleration sensor shown in FIG. 1. At the central portion of the upper surface of the flexible substrate 30, the weight body 50 having a square pillar shape is joined. At the peripheral portion of the upper surface of the flexible substrate 30, the pedestal 40 is joined. A space formed between the pedestal 40 and the weight body 50 corresponds to the cavity portion V2a shown in FIG. 1. It is now assumed that, with respect to the flexible substrate 30, a central portion to which the weight body 50 is joined is called a working area 31, an area corresponding to the cavity portion V2a therearound is called a flexible area 32, and an area where the pedestal 40 is joined therearound is called a fixed area 33. Respective reference numerals indicated within parentheses in FIG. 4 indicate respective areas of the flexible substrate 30. In the side cross sectional view shown in FIG. 1, the central portion of the flexible substrate 30 where displacement takes place along with the weight body 50 is the working area 31, the peripheral portion held between the pedestal 20 and the pedestal 40 is the fixed area 33 and its intermediate portion is the flexible area 32. The flexible area 32 function as a so-called diaphragm. That is, when the weight body 50 is caused to undergo displacement, the flexible area 32 is bent.

Figure 5:
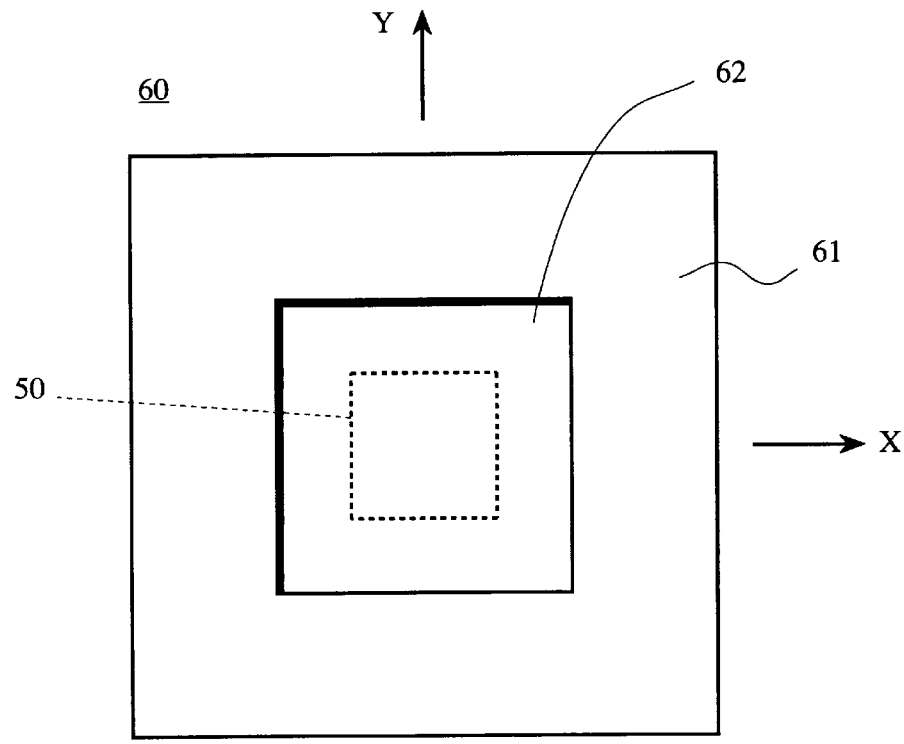
FIG. 5 is a bottom view of the cover substrate 60 of the acceleration sensor shown in FIG. 1 wherein broken lines indicate position of a weight body 50.

FIG. 5 is a bottom view of the cover substrate 60 of the acceleration sensor shown in FIG. 1, wherein broken lines indicate a position of the weight body 50. In the cover substrate 60, a groove portion 62 is formed in the area surrounded by an outer circumferential portion 61. The groove portion 62 serves to form the cavity portion V2b shown in FIG. 1. Even if the outer circumferential portion 61 is joined or bonded to the pedestal 40, a space is ensured between the weight body 50 and the cover substrate 60.

The operation of this acceleration sensor is as follows. Initially, let consider the case where this acceleration sensor is installed in the environment where no acceleration is applied. In this case, as shown in the side cross sectional view of FIG. 1, the flexible substrate 30 and the supporting substrate 10 are held in parallel state. As a result, the capacitance elements C1 to C5 respectively indicate predetermined electrostatic capacitance values. However, when, e.g., force in the positive direction of the X-axis is assumed to be applied to the weight body 50 because an acceleration in the X-axis direction is applied, the weigh body 50 is caused to undergo displacement in the right direction of FIG. 1. As a result, bending takes place in the flexible substrate 30. Thus, the interval between the electrodes E1/E0 is shrinked and the interval between the electrodes E2/E0 is widened. Accordingly, the electrostatic capacitance value of the capacitance element C1 becomes large and the electrostatic capacitance value of the capacitance element C2 becomes small. Similarly, when, e.g., force in the positive direction of the Y-axis is assumed to be applied to the weight body 50 because an acceleration in the Y-axis direction is applied, the interval between the electrodes E3/E0 is shrinked and the interval between the electrodes E4/E0 is widened. Accordingly, the electrostatic capacitance value of the capacitance element C3 becomes large and the electrostatic capacitance value of the capacitance element C4 becomes small. In addition, when force in the positive direction of the Z-axis is assumed to be applied to the weight body 50 because an acceleration in the Z-axis direction is applied, all the electrode intervals are widened. For this reason, e.g., the electrostatic capacitance value of the capacitance element C5 becomes small.

Eventually, the acceleration component in the X-axis direction can be detected by monitoring the electrostatic capacitance values of the capacitance elements C1, C2. Similarly, the acceleration component in the Y-axis direction can be detected by monitoring the electrostatic capacitance values of the capacitance elements C3, C4. Further, the acceleration component in the Z-axis direction can be detected by monitoring the electrostatic capacitance value of the capacitance element C5. In this case, although wirings with respect to the respective lower electrodes E1 to E5 are not indicated in the figure, the wirings for taking out electrostatic capacitance values of respective capacitance elements, as electric signals, are provided in practice.

Although the structure and the operation principle of the acceleration sensor have been disclosed above, it is possible to detect physical action such as force, magnetism or angular velocity, etc. on the basis of the principle similar to the above. For example, if the cover substrate 60 is detached in the structural body shown in FIG. 1 so that force is directly applied to the weight body 50, this sensor functions as a force sensor. Moreover, if the weight body 50 is constituted with magnetic material such as iron or cobalt, etc. in the sensor structural body shown in FIG. 1, it becomes possible to detect force applied on the basis of magnetism. This sensor is permitted to function as a magnetic sensor. Further, if the weight body 50 is oscillated in a predetermined direction by a predetermined method (e.g., applying a.c. voltage across the electrodes E5/E0) and Corioli's force applied in a direction perpendicular to the oscillating direction is detected as a change of an electrostatic capacitance value of a predetermined capacitance element, it becomes possible to detect angular velocity applied around a predetermined axis, thus permitting this sensor to function as an angular velocity sensor. It is to be noted that since the operations as these various sensors are well known technology disclosed in the above-mentioned respective publications, their detailed explanation is omitted.

Figure 6:
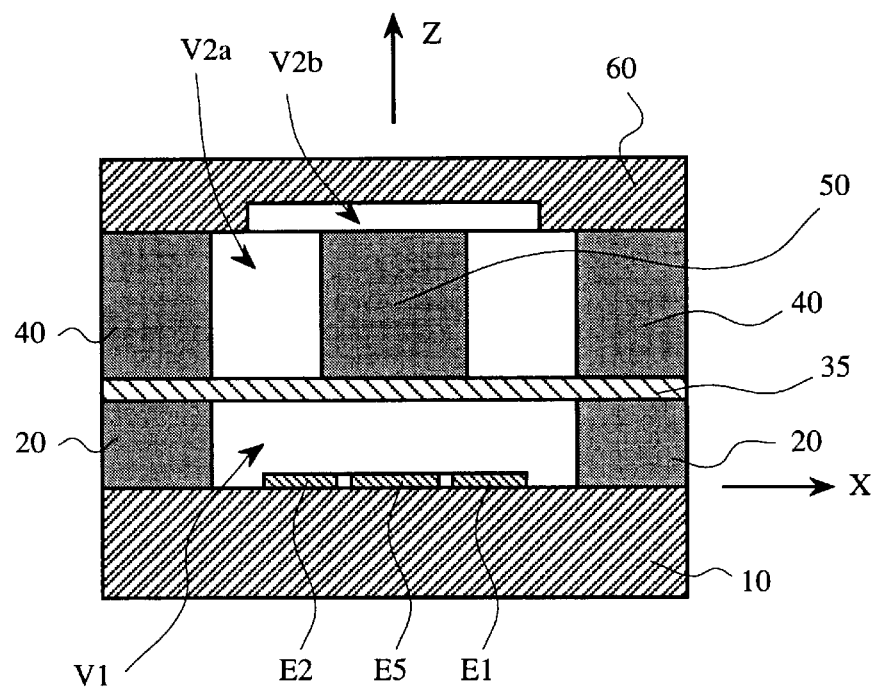
FIG. 6 is a side cross sectional view showing a modified example of the acceleration sensor shown in FIG. 1.

FIG. 6 is a side cross sectional view showing a modified example of the acceleration sensor shown in FIG. 1. From a viewpoint of practical use, it is preferable to adopt the structure shown in FIG. 6 rather than the structure shown in FIG. 1. In the structure shown in FIG. 6, a flexible substrate 35 having conductivity is employed to thereby omit the upper electrode E0. Since the flexible substrate 35 itself functions as an upper electrode having conductivity, it is unnecessary to form a separate upper electrode E0.

In this example, the pedestal 40 and the cover substrate 60 are not necessarily required components, and may be omitted depending upon utilization form. For example, in the case where this sensor is utilized as force sensor, the weight body 50 is caused to be exposed to directly receive applied force to detect it. Moreover, even in the case where this sensor structural body is utilized as an acceleration sensor or an angular velocity sensor, the pedestal 40 and the cover substrate 60 are not necessarily required if this sensor structural body is accommodated within any casing. That is, if the entirety of the sensor structural body is accommodated within a casing and an accident such that any foreign matter comes into contact with the weight body 50 does not take place during detecting operation, there is no problem even in the state where the weight body 50 is exposed within the casing.

Figure 7:
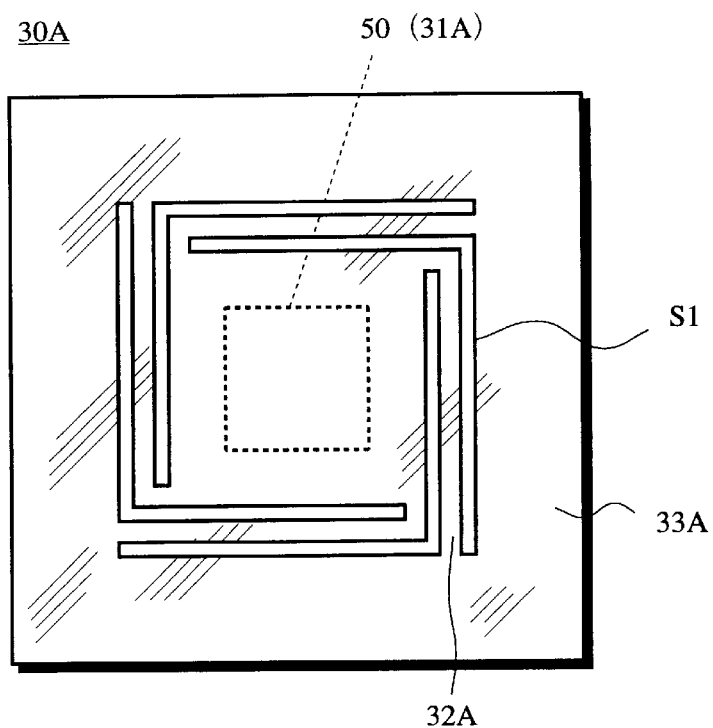
FIG. 7 is a plan view of a flexible substrate 30A having slits S1 suitable when used as a flexible substrate of the acceleration sensor shown in FIG. 1.
Figure 8:
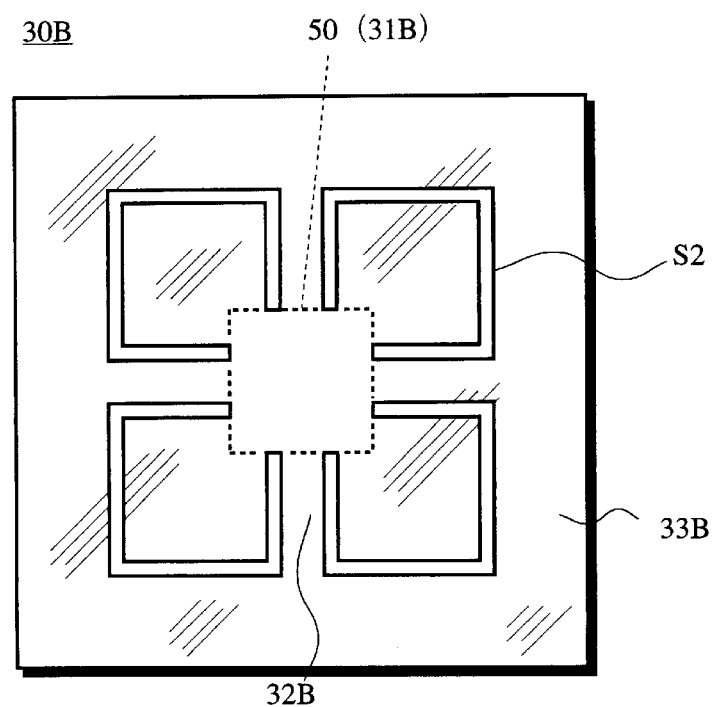
FIG. 8 is a plan view of a flexible substrate 30B having slits S2 suitable when used as a flexible substrate of the acceleration sensor shown in FIG. 1.

Moreover, in order to allow the flexible substrates 30, 35 to have sufficient flexibility, it is preferable to form slits in the flexible area 32. FIG. 7 is a plan view showing an example of the flexible substrate. In this example, a working area 31A is formed at a central portion (portion to which the weight body 50 is joined) of the flexible substrate 30A, a flexible area 32A is formed at a portion therearound, and a fixed area 33A is formed at a portion around the flexible area 32A, and slits Sl are provided in the flexible area 32A. These slits Sl are constituted with an elongated opening window penetrated through the flexible substrate 30A. Formation of this slit S1 permits the flexible substrate 30A to have sufficient flexibility. Similarly, FIG. 8 is a top view showing another example of the flexible substrate wherein a working area 31B is formed at a central portion (the portion to which the weight body 50 is joined) of the flexible substrate 30B, a flexible area 32B is formed at a portion therearound and a fixed area 33B is formed at a portion around the flexible area 32B, and slits S2 are provided in the flexible area 32B. Also in this case, the slits S2 are constituted with elongated opening window penetrated through the flexible substrate 30B. Formation of these slits S2 permits the flexible substrate 30B to have sufficient flexibility.

§2 Fundamental Principle of Manufacturing Method Suitable for Mass Production

The manufacturing method for a sensor structural body shown in FIG. 1 or FIG. 6 is disclosed, e.g., in the above-mentioned U.S. Ps, or in the International Publication No. WO94/23272 based on the Patent Cooperation Treaty. In these manufacturing methods, the semiconductor manufacturing process is diverted so that mass production of the sensor on the commercial base can be made. The fundamental principle of the method suitable for mass production resides in that necessary processes are respectively implemented to plural substrates to manufacture the sensor structural body as a stacked body of plural substrates.

Figure 9:
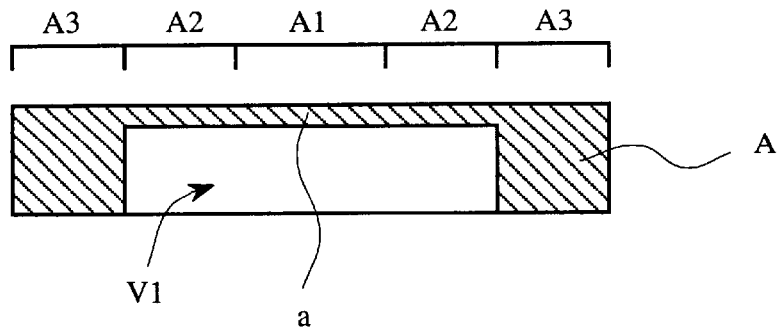
FIG. 9 is a side cross sectional view showing the state where a cavity portion V1 for the capacitance element is formed at the lower surface of the first silicon substrate A.

For example, as shown in the side cross sectional view of FIG. 9, a working area A1 is defined at a central portion of a first silicon substrate A, a flexible area A2 is defined at a periphery thereof, and a fixed area A3 is defined at a periphery of the flexible area A2. Then etching process is carried out to the lower surface with respect to the portion corresponding to the working area A1 and the flexible area A2 so as to form a cavity portion V1 for capacitance element as shown in FIG. 9. In this first silicon substrate A, thickness of the portion which has experienced corrosion by etching (that is, the working area A1 and the flexible area A2) is caused to be thinner than thickness of the portion which has not experienced corrosion (that is, the fixed area A3). Thus, a diaphragm portion a is formed.

Figure 10:
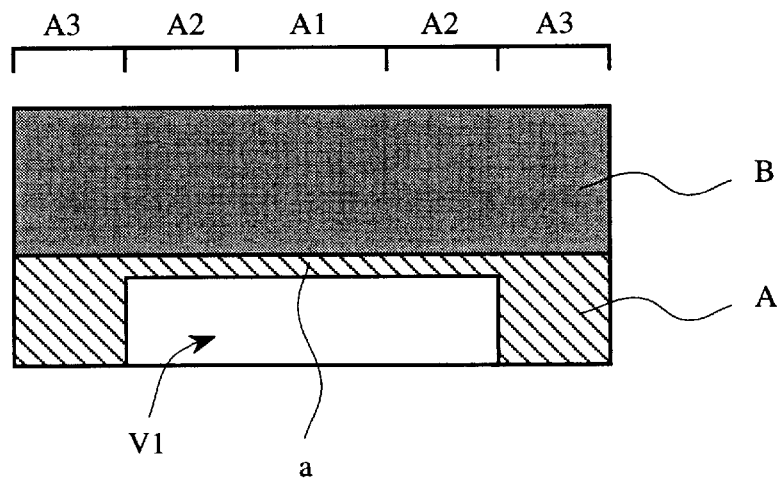
FIG. 10 is a side cross sectional view showing the state where the second silicon substrate B is bonded on the upper surface of the first silicon substrate A shown in FIG. 9.
Figure 11:
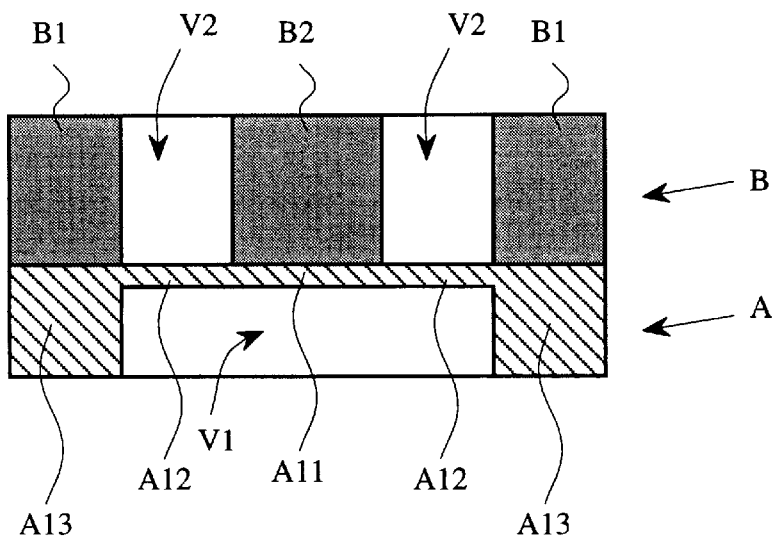
FIG. 11 is a side cross sectional view showing the state where a cavity portion V2 for the weight body is formed at the upper surface of the second silicon substrate B shown in FIG. 10.

Subsequently, as shown in the side cross sectional view of FIG. 10, a second silicon substrate B is joined (bonded) to the upper surface of the silicon substrate A and then etching process is carried out to the upper surface of the second silicon substrate B with respect to an annular portion corresponding to the flexible area A2 so that a cavity portion V2 for weight body can be formed as shown in the side cross sectional view of FIG. 11. In other words, the second silicon substrate B is divided into two portions of the pedestal B1 comprised of an outer circumferential portion and the weight body B2 comprised of a central portion. On the other hand, on the first silicon substrate A, there are formed a working portion A11 to which the weight body B2 is joined (bonded), a flexible portion A12 arranged therearound and a fixed portion A13 arranged at a periphery of the flexible portion A12. When the structure shown in FIG. 11 is compared to the sensor structural body of FIG. 6, it is seen that the fixed portion A13 functions as the pedestal 20, the working portion A11 and the flexible portion A12 function as the flexible substrate 35, the pedestal B1 functions as the pedestal 40, and the weight body B2 functions as the weight body 50. In view of the above, when a substrate functioning as the supporting substrate 10 is further joined on the lower surface of the structural body shown in FIG. 11 and a substrate functioning as the cover substrate 60 is joined on the upper surface thereof, a sensor structural body shown in FIG. 6 can be obtained.

If this sensor structural body is realized by the stacked structure composed of plural substrates, the conventional semiconductor manufacturing process can be utilized and mass production on the commercial base can be carried out.

Figure 12:
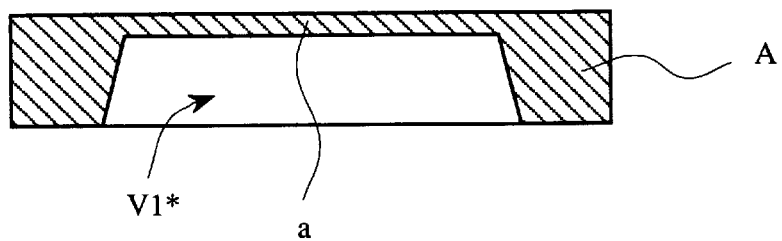
FIG. 12 is a side cross sectional view showing a cavity portion V1* for the capacitance element formed at the first silicon substrate A by actual etching process.
Figure 13:
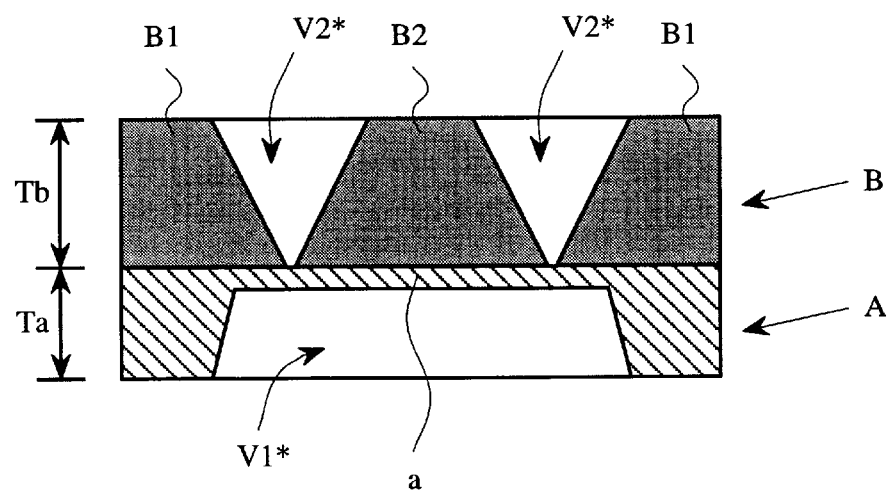
FIG. 13 is a side cross sectional view showing a cavity portion V21* for the weight body formed at the second silicon substrate B by actual etching process.

However, in the methods disclosed in the above-mentioned respective publications, limitation takes place in carrying out miniaturization. This limitation is derived from very fine processing technology using etching in the typical semiconductor manufacturing process. Namely, the structure shown in FIGS. 9 to 11 indicates the ideal state where etching process for forming cavity portions V1, V2 was carried out as complete anisotropic etching. However, in practice, it is impossible to carry out such an ideal anisotropic etching with typical etching technology currently carried out. For example, in FIG. 9, the side wall surface of the cavity portion V1 for capacitance element is indicated as a plane surface perpendicular to the substrate surface. However, in actual, the side wall surface is formed as a taper surface to define a cavity portion V1* as shown in FIG. 12. Such an imperfect anisotropic etching characteristic exhibits more serious problem in carrying out processing for forming a cavity portion V2 for weight body on the second silicon substrate B. Namely, when an actual anisotropic etching process is carried out to the second substrate B, a cavity portion V2* for weight body having a shape as shown in the side cross sectional view of FIG. 13 is actually formed. As shown in the figure, a cross section of the cavity portion V2* becomes a triangle such that a width becomes smaller according as a depth becomes larger.

When an attempt is made to realize a more compact sensor structural body, this problem is developed into more serious problem. Particularly, in the process for forming the cavity portion V2* for weight body, seriousness is increased to more degree. The reason thereof is that thickness of the second silicon substrate B should be set to become considerably thick as compared to thickness of the first silicon substrate A. Although thicknesses of both the substrates A and B are not indicated by precise ratio in the figure of this application for convenience of explanation, thickness Tb of the second silicon substrate B cannot help being considerably large as compared to the thickness Ta of the first silicon substrate A in FIG. 13 in practice. The thickness Ta becomes a total value of depth of the cavity portion V1* and thickness of the diaphragm portion a. In this case, the depth of the cavity portion V1* for capacitance element becomes a dimension which rules an electrode interval of capacitance element. Therefore, it is preferable to set this dimension to a small value for the purpose of realizing miniaturization of the sensor while maintaining detection sensitivity. Moreover, with respect to thickness of the diaphragm portion a, it is preferable to set it to also a small value for the purpose of ensuring sufficient flexibility. On the contrary, with respect to thickness Tb of the second silicon substrate B, it is preferable to set it to a large value. The reason thereof is that the thickness Tb is a dimension for ruling mass of the weight body B2, and therefore in view of ensuring detection sensitivity to some degree, it is necessary to ensure sufficient thickness Tb so that mass of the weight body B2 becomes an enough value for detection.

Eventually, as long as the cavity portion V2 for weight body is formed by using the conventional typical etching technique, there occurs limitation in miniaturization of the sensor. There is another technique for forming the cavity portion V2 for weight body such as a mechanical cutting method in which a dicing blade is used as disclosed in the above-mentioned publications. In accordance with this method, there is carried out a process for joining the substrate B to the substrate A. Thereafter a dicing blade having a predetermined width is set in contact with the upper surface of the substrate B to mechanically cut the substrate B from the upper surface. In recent years, with development of the micromachining technology, a considerably fine groove can be obtained by using the dicing blade.

Figure 14:
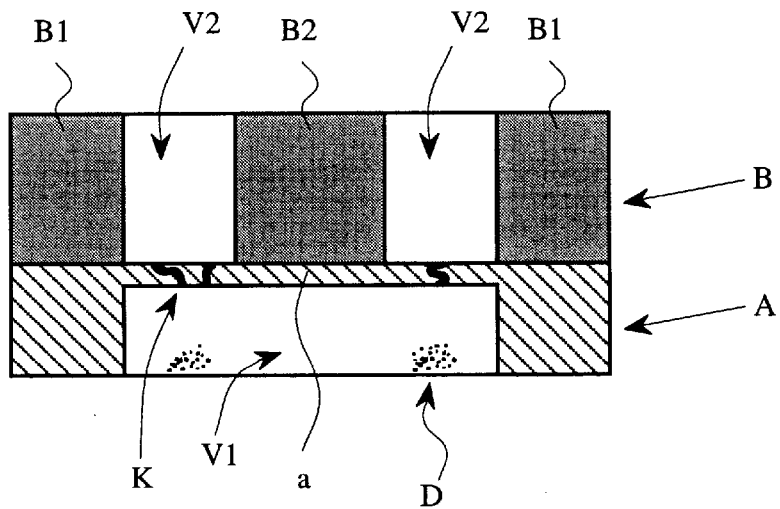
FIG. 14 is a side cross sectional view showing drawbacks in the case where the cavity portion V2 for the weigh body is formed at the second silicon substrate B by mechanical cutting process using a dicing blade.

However, in this mechanical cutting method, there is another problem of occurrence of cracks. Namely, when the mechanical cutting with a dicing blade is carried out, it is possible to obtain a groove having a sufficient width until the deep portion (this groove becomes a cavity portion V2 for weight body) as shown in the side cross sectional view of FIG. 14. However, cracks K are apt to be appeared at the diaphragm portion a of the substrate A by mechanical stress applied from the upper direction. The diaphragm portion a is thin in thickness in order to allow it to have flexibility. According as more compact sensor is realized, occurrence of cracks K is not inevitable. Moreover, in the case where the slits S1, S2 as illustrated in FIG. 7 or FIG. 8 are formed in order to allow the diaphragm portion a to have sufficient flexibility, there also takes place another problem in which shavings D fall into the cavity portion V1 for capacitance element through these slits as shown in FIG. 14. The cavity portion V1 for capacitance element is an important space for determining distance between the electrodes constituting the capacitance element. When shavings D are mixed thereinto, serious hindrance takes place in measurement.

This invention contemplates proposing a new technique for solving the above-described problems which prevent miniaturization of the sensor and for realizing mass-production of the sensor on the basis of the fundamental principle of stacking plural substrates.

§3 First Embodiment of This Invention

Figure 15:
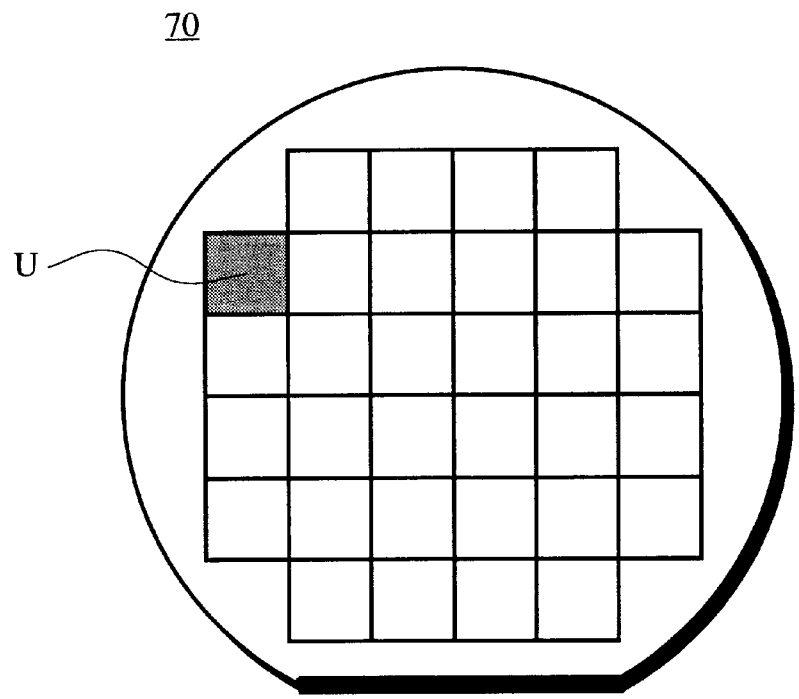
FIG. 15 is a plan view showing the state where unit areas U corresponding to respective semiconductor pellets are defined in the case where the semiconductor integrated circuits are mass-produced by using a single substrate 70.

The first embodiment of this invention will be described below in conformity with an actual example. As described above, the fundamental principle of this invention resides in that plural substrates are stacked to thereby constitute a sensor structural body. Ordinarily, when a substrate is used for mass production of semiconductor integrated circuits, a large number of unit areas U are defined on a substrate 70 (semiconductor wafer) as shown in the plan view of FIG. 15 (portion to which hatching is implemented in the figure serves as a single unit area U) to form respectively independent semiconductor elements (semiconductor pellets) by respective individual unit areas. Then the substrate 70 is cut to divide every respective unit areas to thereby take out plural semiconductor elements from a single substrate 70. In the manufacturing method of the sensor according to this invention, similarly, a large number of unit areas U are defined on respective substrates to constitute respectively independent sensor structural bodies. Finally, the stack of the substrates are cut into respective unit areas to obtain a large number of sensor structural bodies. The following explanation will be given, for convenience of explanation, in connection with the simple example in which only four unit areas U1 to U4 are defined on a single substrate 80 as shown in the plan view of FIG. 16 in place of describing the example in which a large number of unit areas U are defined on a single substrate 70 as shown in the plan view of FIG. 15. Accordingly, side cross sectional views in the following explanation all correspond to the cross sectional view cut along the cutting lines W—W of the substrate 80 shown in FIG. 16.

Figure 17:
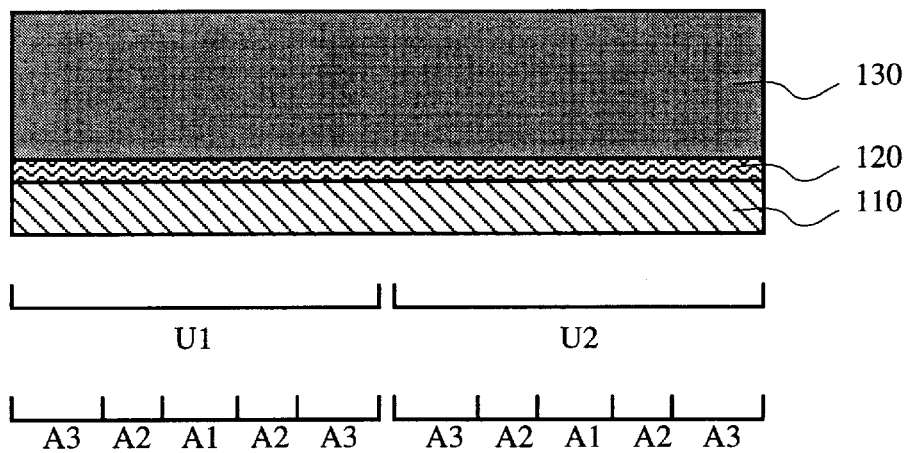
FIG. 17 is a side cross sectional view of a first substrate 100 having a three layer structure used in an embodiment of this invention.

Initially, a first substrate 100 as shown in the side cross sectional view of FIG. 17 is prepared. The first substrate 100 corresponds to the substrate A described in the fundamental principle of §2. In this example, a substrate having three layer structure of a lower layer portion 110, a middle layer portion 120 and an upper layer portion 130 is used as the first substrate 100, and the middle layer portion 120 is constituted by material having etching characteristic different from that of the lower layer portion 110 and the upper layer portion 130. In more practical sense, in the embodiment described here, the lower layer portion 110 and the upper layer portion 130 are constituted by silicon, and the middle layer portion 120 is constituted by silicon oxide film ($SiO_2$). Silicon and silicon oxide are different in etching characteristic. Since the middle layer portion 120 is made of material having different etching characteristic, it can function as etching stopper in the etching process of the upper layer portion 130 which will be described later. It is a matter of course that silicon nitride film, etc. may be used as material of the middle layer portion 120 as far as connection to the other layers can be made.

As stated above, the main reason why middle layer portion 120 is provided is to allow it to function as etching stopper. Therefore various materials may be used for the middle layer portion 120 in addition to the above described materials, providing that the material has etching characteristic different from that of the lower layer portion 110 and the upper layer portion 130. It is preferable to constitute the middle layer portion 120 by insulating material, because it is possible to prevent external electric noises from being mixed into the lower layer portion 110 which directly participates in measurement even in the case where a portion of the upper layer portion 130 is connected to the sensor casing at the subsequent process step.

Moreover, n type or p type impurities are added in silicon constituting the lower layer portion 110 so that the lower layer portion 110 functions as a conductive layer. In the subsequent process step, a cavity portion V1 for capacitance element is formed within the lower layer portion 110. If the lower layer portion 110 is constituted by the conductive layer with the impurities, since the upper wall surface of the cavity portion V1 has conductivity, there is a merit that an upper electrode of the capacitance element can be constituted by the upper wall surface. In other words, the sensor structural body shown in FIG. 6 can be obtained in place of the sensor structural body shown in FIG. 1. Thus, the process step for forming an upper electrode becomes unnecessary.

In this case, as in the example shown in FIG. 17, substrate 100 having three layer structure of silicon/silicon oxide/silicon is generally put on the market as a so-called SOI wafer (Silicon On Insulator wafer: usually single crystal is formed at a portion of silicon). If such a wafer on the market is utilized, the manufacturing cost can be further reduced. Dimensions of the substrate 100 actually used in this embodiment are presented for reference as follows. Diameter: $\phi$152 mm (6 inches), thickness of the lower layer portion 110: 15 $\mu$m, thickness of the middle layer portion 120: 1 $\mu$m, and thickness of the upper layer portion 130: 600 $\mu$m. A thickness of the wafer which can be utilized in the ordinary micro-machining is about 300 $\mu$m (If thickness is more thicker, processing of depth portion becomes difficult), and a diameter is about 100 mm (4 inches). However, in this invention, since etching process is used in combination as described later, a wafer having thickness of about 600 $\mu$m can be utilized. Thus, a wafer of large diameter which is so called six inch wafer can be utilized. The point where productivity can be enhanced by using a large diameter wafer is also one of the merits of this invention.

Figure 16:
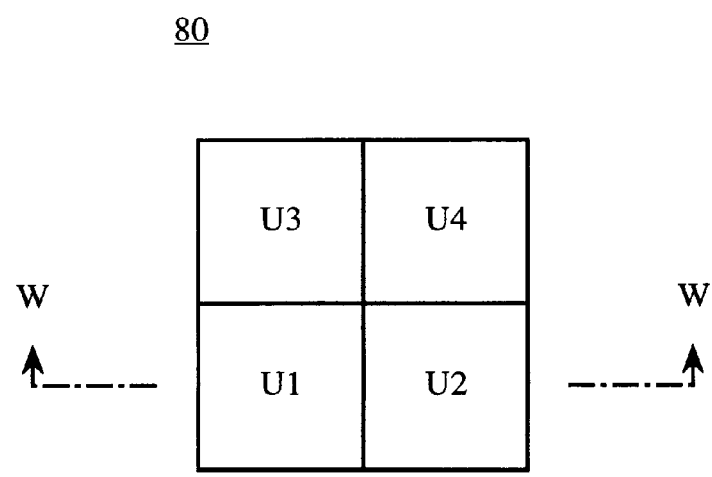
FIG. 16 is a plan view showing a simple example in which only four unit areas U1 to U4 are defined on substrate 80.
Figure 18:
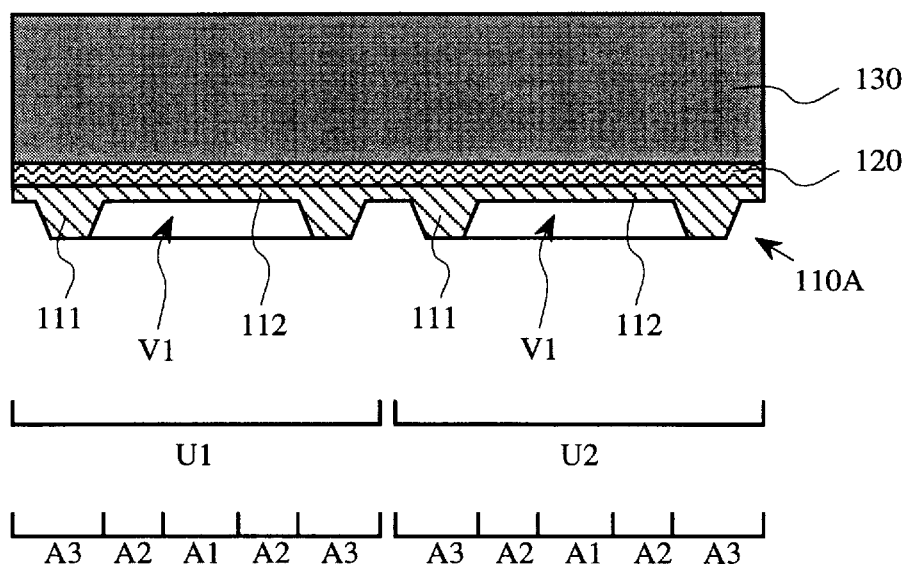
FIG. 18 is a side cross sectional view showing the state where cavity portions V1 for capacitance elements are formed at the lower surface of the first substrate 100 shown in FIG. 17 to constitute a lower layer portion 110A.

After a first substrate 100 is prepared, plural unit areas U are defined on this substrate. In this embodiment, as shown in FIG. 16, four unit areas U1 to U4 are defined on a single substrate. In the side cross sectional view of FIG. 17, two unit areas U1, U2 thereof are indicated. Subsequently, in the respective unit area, a working area A1 is defined at the central portion, a flexible area A2 is defined at the periphery of the working area A1, and a fixed area A3 is defined at the periphery of the flexible area A2. Then etching is implemented to the lower surface of the first substrate 100 to form a cavity portion V1 for capacitance element in the working area A1 and the flexible area A2. FIG. 18 is a side cross sectional view showing the state where cavity portions V1 for capacitance element is formed at the lower surface of the first substrate 100 by such etching process. A portion of the lower layer portion 110 is removed by this etching process to constitute a lower layer portion 110A. This lower layer portion 110A is constituted by a pedestal portion 111 formed in the fixed area A3 and a diaphragm portion 112 formed in the working area A1 and the flexible area A2. Thus, the cavity portion V1 for capacitance element is formed wherein the pedestal portion 111 is caused to be a side wall and the diaphragm portion 112 is caused to be an upper wall. It is to be noted that although removing by etching is carried out also with respect to the boundary portion between the unit areas U1 and U2 as shown in FIG. 18, this removing is carried out for convenience in carrying out cutting every respective unit areas.

Figure 19:
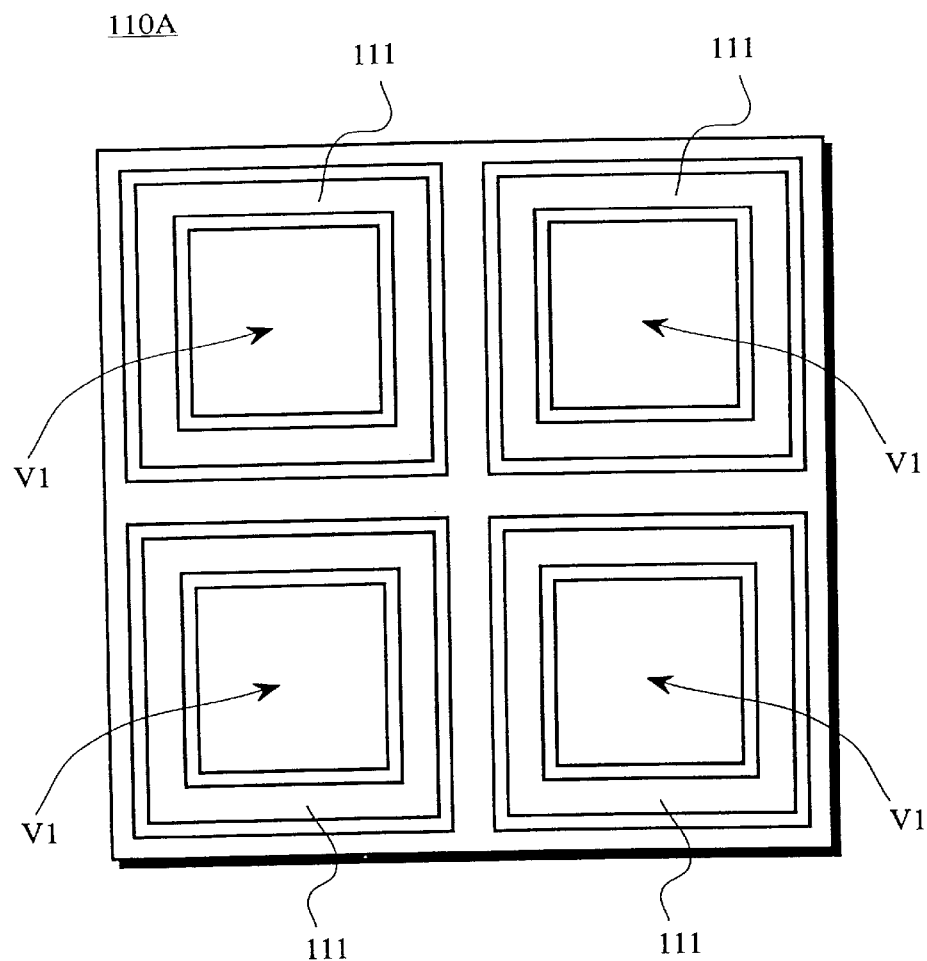
FIG. 19 is a bottom view of the lower layer portion 110A shown in FIG. 18, wherein the cross section cut along the cutting lines W—W of the lower layer portion 110A is shown in FIG. 18.

FIG. 19 is a bottom view of the lower layer portion 110A wherein the cavity portions V1 for capacitance element are respectively encompassed by the pedestal portions 111 in every four unit areas as clearly indicated in the figure. The cross section of the lower layer portion 110A shown in FIG. 19 is shown in FIG. 18. It is to be noted that while square shaped pedestal portions 111 are formed in the embodiment shown in FIG. 19, a shape of the pedestal portion 111 may be an annular shape or may be other shapes.

As stated above, in the etching process for forming the cavity portions V1 for capacitance element, it is sufficient to use the technique of typical etching utilized in the general semiconductor process. In this embodiment, depth of the cavity portion V1 for capacitance element is about 2 $\mu$m. Though the side wall surface of the cavity portion V1 for capacitance element to be formed has taper as shown in FIG. 18, the depth of the cavity is very small as compared to the frontage of the cavity. Therefore, typical etching technique (wet etching or dry etching) conventionally used can be utilized as it is. It is to be noted that dimensional ratio between respective portions in the side cross sectional view is not in correspondence with the actual dimensional ratio of this embodiment (e.g., in the actual dimension of this embodiment, thickness of the diaphragm portion 112 is about 13 $\mu$m and depth of cavity portion V1 for capacitance element is about 2 $\mu$m, but illustration is not made by such a dimensional ratio in the figure.).

Figure 20:
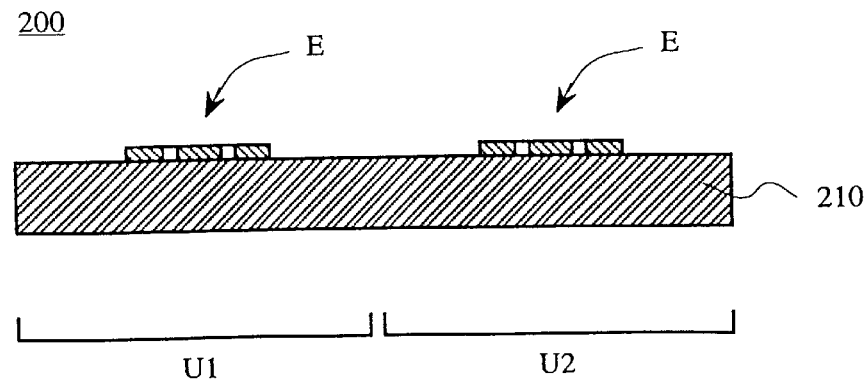
FIG. 20 is a side cross sectional view taken along line 20—20 in FIG. 21 of a second substrate 200 used in an embodiment of this invention.
Figure 21:
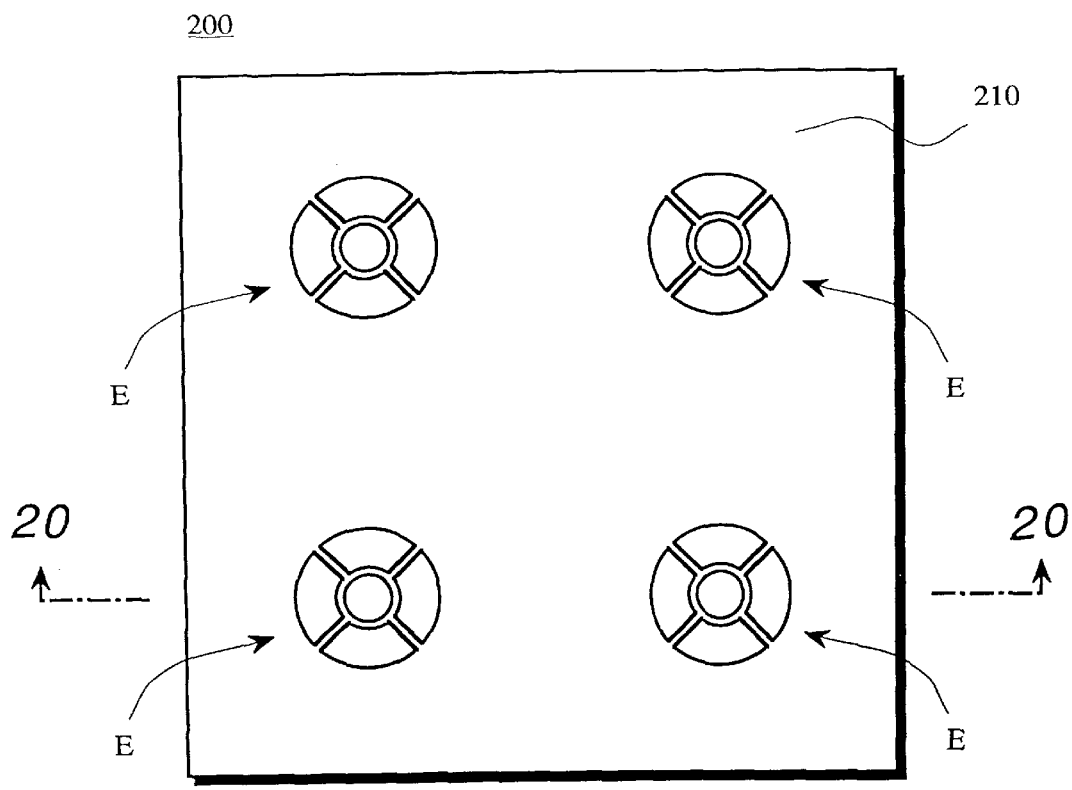
FIG. 21 is a top view of the second substrate 200 shown in FIG. 20.

Subsequently, a second substrate 200 which will be disposed in a manner opposite to the lower surface of the first substrate 100 is prepared. On the second substrate, lower electrodes E are provided as shown in FIG. 20 so that capacitance elements can be formed between the upper wall surface of the cavity portion V1 for capacitance element formed on the first substrate 100 and the lower electrodes E on the second substrate 200. In this embodiment, as the lower layer portion 110A has conductivity, the upper wall surface of the cavity portion V1 for capacitance element functions as the upper electrode of the capacitance element. On the other hand, the lower electrodes E are formed on the upper surface of the substrate body 210 as shown in the side cross sectional view of FIG. 20. In this example, as the substrate body 210 constituting the second substrate, glass substrate having thickness of about 500 $\mu$m is used, and the lower electrodes E are formed as a vacuum deposition film such as aluminum or chromium, etc. on the glass substrate. FIG. 21 is a top view of the second substrate 200 after forming the lower electrodes E. The cross section taken along lines 20—20 in FIG. 21 is shown in the side cross sectional view of FIG. 20. The lower electrode E formed in a unit area is composed of five independent electrodes, and functions as the lower electrodes E1 to E5 shown in FIG. 2. It is to be noted that although not shown in FIG. 21, wiring pattern with respect to the respective lower electrodes is formed on the substrate body 210 of the second substrate 200 in practice.

In this embodiment, the lower layer portion 110A is constituted by conductive material and the upper wall surface of the cavity portion V1 for capacitance element is utilized as a common electrode layer. However, in a manner opposite to this embodiment, the second substrate 200 may be constituted only by the substrate body 210 consisting of conductive material so that the lower wall surface of the cavity portion V1 for capacitance element (that is, the upper surface of the substrate body 210) is used as a common electrode layer. In this case, five upper electrodes are to be constituted on the upper wall surface portion of the lower layer portion 110A which is made of insulating material.

Figure 22:
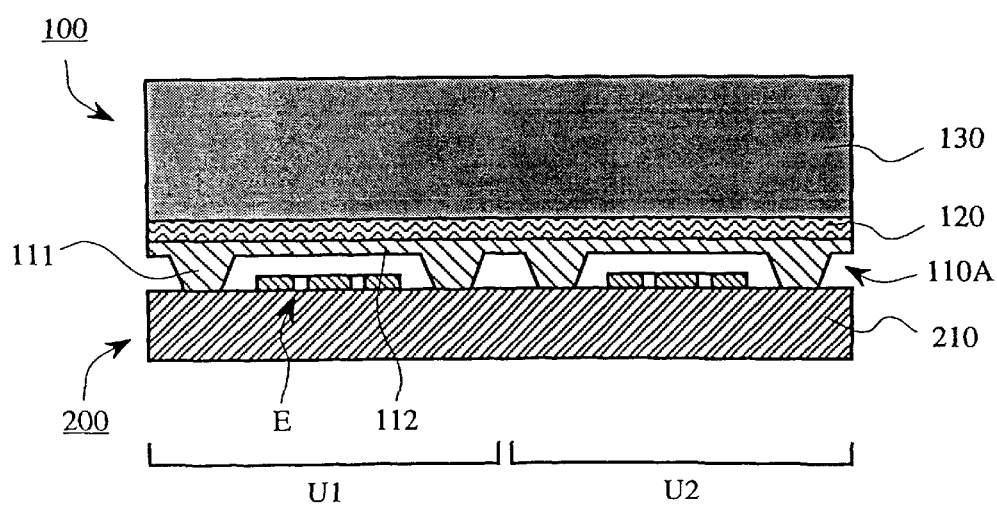
FIG. 22 is a side cross sectional view showing the state where the second substrate 200 shown in FIG. 20 is bonded to the lower surface of the first substrate 100 shown in FIG. 18.

If preparation of the first substrate 100 and the second substrate 200 is made in this way, the lower surface of the pedestal portion 111 of the first substrate 100 is bonded to the upper surface of the second substrate 200 (e.g., anode bonding can be used) in the state where the lower surface of the first substrate 100 and the upper surface of the second substrate 200 are opposite to each other thus to form capacitance elements within the cavity portion V1 for capacitance element. FIG. 22 is a side cross sectional view showing the state where both the substrates 100 and 200 are bonded in this way.

Subsequently, there will be carried out a process to dig the upper layer portion 130 from the upper surface to make grooves to form a weight body. In this case, since it is necessary to ensure mass to some degree in the weight body, the thickness of the upper layer portion 130 is considerably great (600 $\mu$m in this embodiment). For this reason, it is difficult to make grooves having sufficient depth by the typical etching as previously described. Moreover, when consideration is made in connection with occurrence of crack with respect to the diaphragm portion 112, it is also difficult to make grooves by the mechanical cutting process using a dicing blade. In view of the above, in this invention, the groove formation process for forming the weight body is assumed to be executed in a manner separated into two process steps. Namely, in the first half process, cutting processing is initially implemented by the mechanical method using a dicing blade from the upper surface of the upper layer portion 130 to make grooves having a first depth. Subsequently, in the second half process, etching is implemented to the bottom portion of the grooves to thereby proceed to dig the grooves so that their depths are equal to the second depth. If a safety depth such that no crack takes place in the diaphragm potion 112 is set as a first depth, the problem of occurrence of crack which is the drawback of the mechanical cutting processing can be eliminated. In addition, since the groove of the first depth has been already formed by the first half process, it is sufficient for the etching process in the second half process to proceed to dig the grooves of the first depth so that their depths become equal to the second depth. For this reason, grooves having sufficient width even at a deep portion can be formed.

Figure 23:
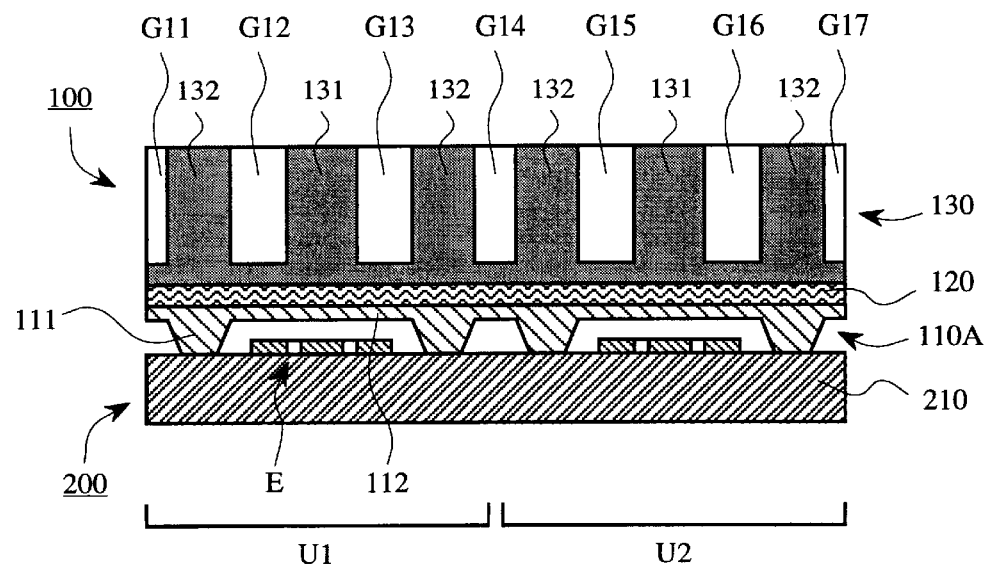
FIG. 23 is a side cross sectional view similar to FIG. 22 showing the state where mechanical cutting work is carried out with dicing blade to the upper surface of the structure shown in FIG. 22 to form grooves G11 to G17 of a first depth.
Figure 24:
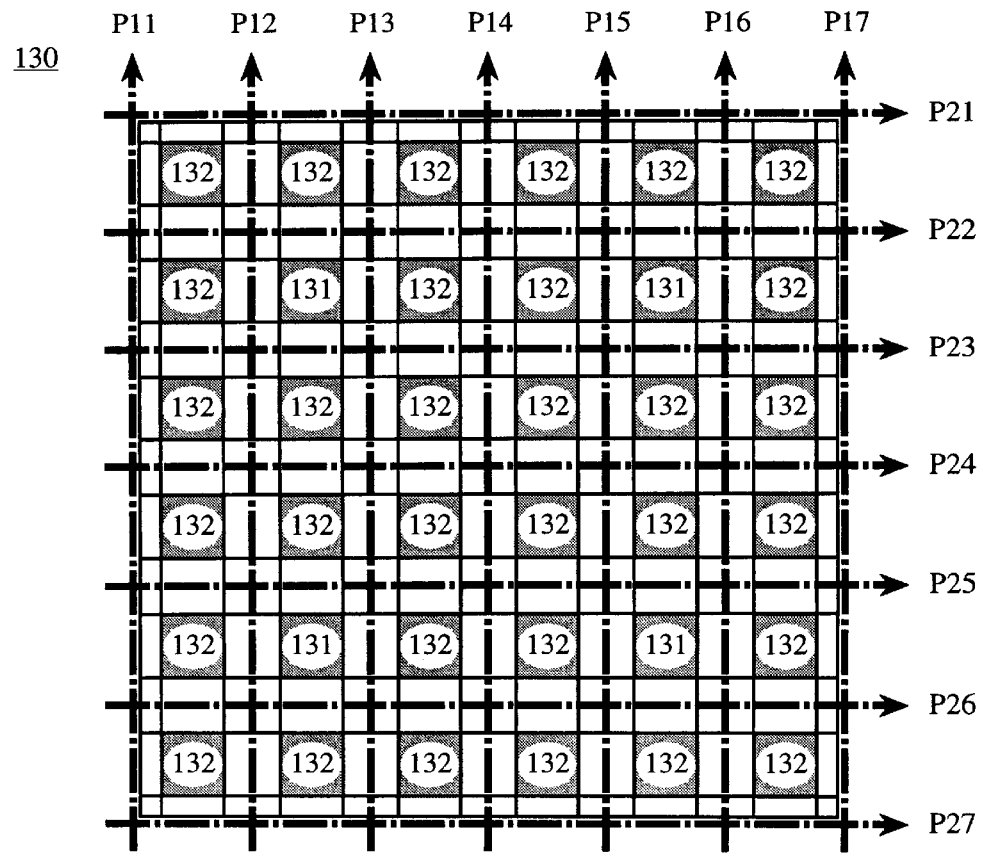
FIG. 24 is a plan view showing path of dicing blade on the upper layer portion 130 during the mechanical cutting work shown in FIG. 23.

FIG. 23 is a side cross sectional view showing the state where grooves of the first depth are formed by the first half process. There is clearly shown the state where the upper layer portion 130 is cut by the dicing blade from the upper surface so that the grooves G11 to G17 having a first depth are formed. In carrying out this cutting process of groove, it is efficient to dig grooves continuous over plural unit areas. FIG. 24 is a plan view showing paths of the dicing blade on the upper layer portion 130 in this cutting process. Longitudinal paths P11 to P17 and lateral paths P21 to P27 indicated by arrows of single dotted lines in the figure respectively indicate paths at the time of cutting process using the dicing blade of a predetermined width. As the grooves are formed by moving the dicing blade in length and breadth directions on the first substrate 100, very efficient processing can be made. As a result, grooves continuous over plural unit areas are formed. Namely, the grooves G11 to G17 (shown in the side cross sectional view of FIG. 23) are formed along the longitudinal paths P11 to P17, and the grooves G21 to G27 (which are not illustrated) are formed along the lateral paths P21 to P27.

The formation process of grooves in the first embodiment aims at forming a weight body and a pedestal by using a part of the upper layer portion 130, and forming a flexible portion by using a part of the diaphragm portion 112. In the plan view of FIG. 24, areas indicated by implementing hatching indicate the portions which have not been on the paths of the dicing blade. These portions serve as portions constituting the weight body 131 or the pedestal 132 (respective weight bodies 131 are formed at the central portions and eight pedestals 132 are formed therearound in the respective unit areas). In addition, respective portions which have been on the paths of the dicing blade (the portions of the flexible areas surrounding the periphery of the respective weight bodies 131) ultimately constitute the flexible portions.

As shown in FIG. 23, when the grooves of the first depth are formed, process of the second half to proceed to dig the bottom portions of these grooves is executed so that their depths become equal to the second depth. In this embodiment, as the second depth, a depth such that the upper surface of the lower layer portion 110A is exposed is set. Accordingly, in the process of second half, digging procedure is carried out to the bottom portions of the respective grooves G11 to G17 in FIG. 23 so as to eliminate a remaining part of the upper layer portion 130 and the middle layer portion 120 to expose the upper surface of the lower layer portion 110A. In this embodiment, the process of the second half is carried out in a manner separated into two etching stages. Namely, the former stage to proceed to dig the upper layer portion 130 by using first etching liquid and the latter stage to proceed to dig the middle layer portion 120 by using second etching liquid are carried out. As described above, the upper layer portion 130 and the middle layer portion 120 are layers consisting of materials having different etching characteristics from each other. Therefore, as first etching liquid, liquid suitable for etching of the upper layer portion 130 is selected, and as second etching liquid, liquid suitable for etching of the middle layer portion 120 is selected.

Of course, dry etching may be carried out in place of the wet etching. In this case, it is sufficient to select gas suitable for etching of the upper layer portion 130 as first etching gas, and to select gas suitable for etching of the middle layer portion 120 as second etching gas. In more practical sense, e.g., it is sufficient to carry out wet etching using isotropic etching liquid consisting of mixed liquid such as HF, $HNO_3$ and $H_2O$ or anisotropic etching liquid such as KOH or hydrazine with respect to silicon constituting the upper layer portion 130, and to carry out dry etching using etching gas such as $CF_4$ or $SF_6$ with respect to silicon oxide constituting the middle layer portion 120.

Figure 25:
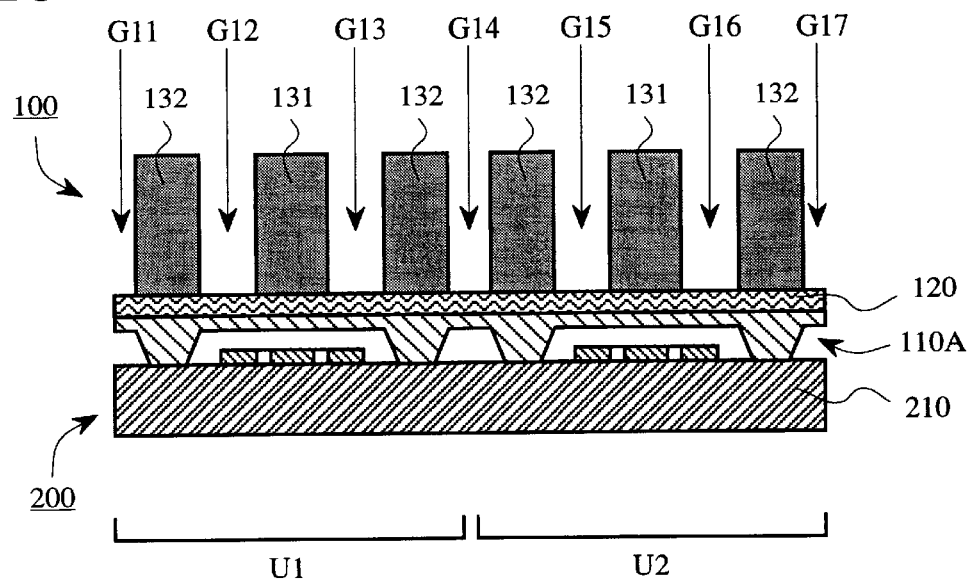
FIG. 25 is a side cross sectional view similar to FIG. 23 showing the state where etching process to the upper layer portion 130 of the structure shown in FIG. 23 is completed by using first etching liquid.
Figure 26:
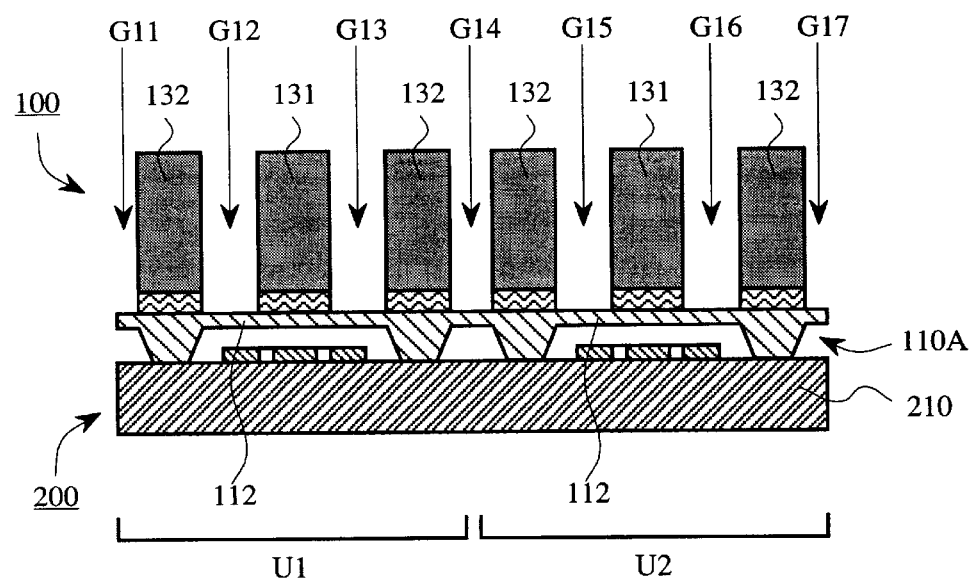
FIG. 26 is a side cross sectional view similar to FIG. 25 showing the state where etching process to the middle layer portion 120 of the structure shown in FIG. 25 is completed by using second etching liquid.

FIG. 25 is a side cross sectional view showing the state where etching with respect to the upper layer portion 130 has been completed by using the first etching liquid. At the bottom portions of the respective grooves G11 to G17, the upper surface of the middle layer portion 120 is exposed. Since the middle layer portion 120 constituted with the material (silicon oxide) having etching characteristic different from that of the material (silicon) of the upper layer portion 130 functions as etching stopper, the etching process of the former stage using the first etching liquid has been substantially completed in this state. Subsequently, etching process of the latter stage using the second etching liquid is carried out. FIG. 26 is a side cross sectional view showing the state where etching with respect to the middle layer portion 120 has been completed by using the second etching liquid. At the bottom portions of the respective grooves G11 to G17, the upper surface of the lower layer portion 110A is exposed. Since the second etching liquid has no etching selectivity with respect to the material (silicon) constituting the lower layer portion 110A, the etching process of the latter stage using the second etching liquid has been substantially completed in this state.

Eventually, as shown in FIG. 26, the grooves G11 to G17 are to be dug so that their depths reach the upper surface of the lower layer portion 110A. Since this digging process is processing by etching, there is no risk of cracking in the lower layer portion 110A. Moreover, since the etching process of two stages using two kinds of etching liquids having etching selectivity is carried out as described above, it becomes possible to precisely control degree of progression of etching. In other words, all the respective grooves have uniform depth such that their depths reach the upper surface of the lower layer portion 110A, and the thickness of the diaphragm portion 112 of the lower layer portion 110A is substantially uniform in all the unit areas.

By providing the middle layer portion 120 in this way, it becomes possible to precisely control depth of grooves formed in the etching process. However, if degree of progression of the etching process can be sufficiently controlled by suitably setting the etching condition, etc., the middle layer portion 120 may be omitted. In this case, it is sufficient to prepare a single silicon substrate as a first substrate 100. As a method of controlling etching with high accuracy, electrochemical etching is known. If this method is used, the middle layer portion 120 becomes unnecessary. For example, it is sufficient to allow the first substrate 100 to be of double layer structure of p-type upper layer portion 130 and n-type lower layer portion 110. If bias voltage is applied to the lower layer portion 110 in the state where this substrate is immersed in KOH liquid, etching is stopped at the stage where the upper surface of the lower layer portion 110 is exposed.

Figure 27:
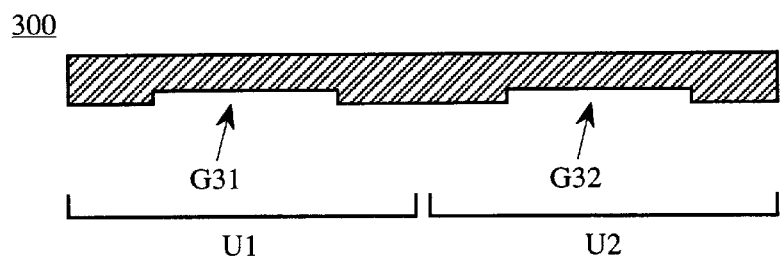
FIG. 27 is a side cross sectional view taken along 27—27 in FIG. 28 of a third substrate 300 used in a first embodiment of this invention.
Figure 28:
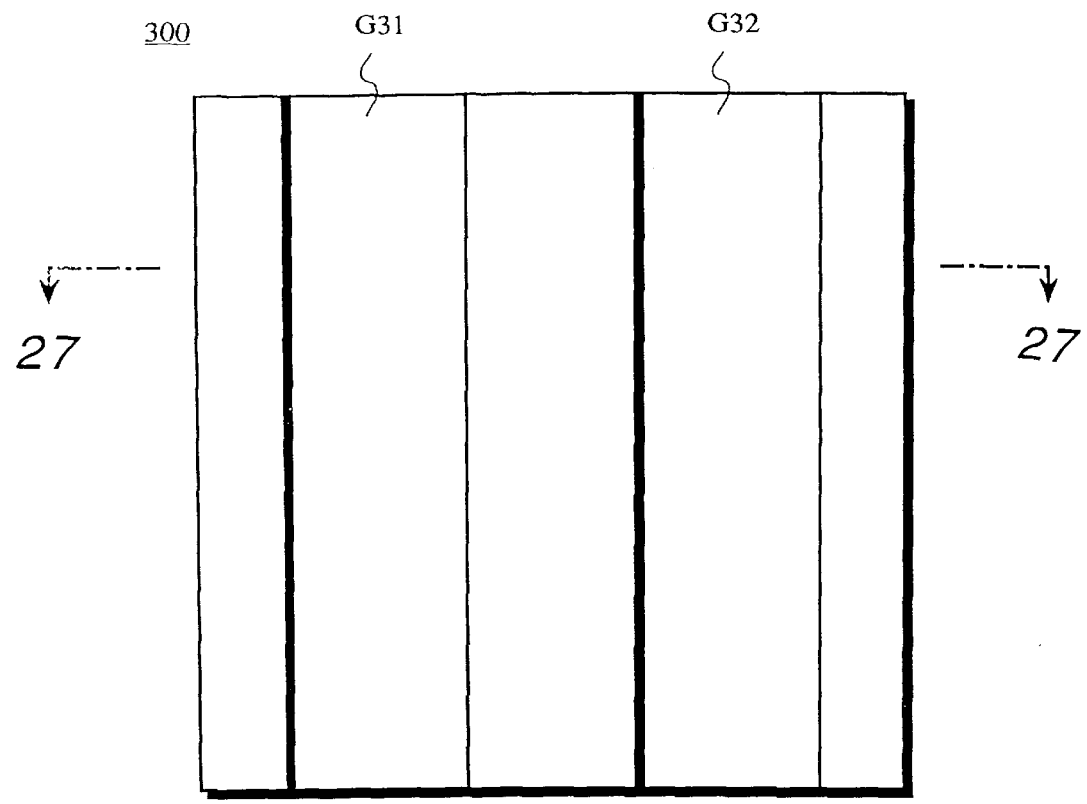
FIG. 28 is a bottom view of the third substrate 300 shown in FIG. 27.

Subsequently, a third substrate 300 which will be disposed in a manner opposite to the upper surface of the first substrate 100 is prepared. An example of the third substrate 300 is shown in FIG. 27, and the bottom view thereof is shown in FIG. 28. While glass substrate is used in this embodiment as the third substrate 300, the third substrate 300 may be constituted with other material. In addition, in this embodiment, grooves G31, G32 are formed on the lower surface of the third substrate 300. These grooves G31, G32 serve to ensure gap for permitting movement of the weight body 131 in an upper direction.

Figure 29:
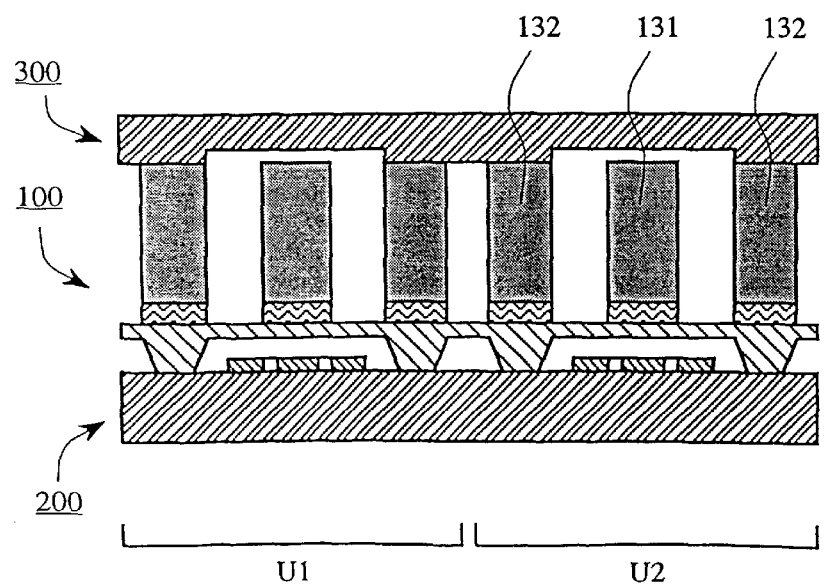
FIG. 29 is a side cross sectional view taken along 29—29 in FIG. 28 showing the state where the third substrate 300 is further bonded onto the upper surface of the structure shown in FIG. 26.

Then, the upper surface of the pedestal 132 is bonded to the lower surface of the third substrate 300 (e.g., anode bonding is used) in the state where the upper surface of the first substrate 100 and the lower surface of the third substrate 300 are opposite to each other. FIG. 29 is a side cross sectional view showing the state where the third substrate 300 is bonded. It is seen that a space, within which the weight body 131 is permitted to undergo displacement with a predetermined degree of freedom, is formed by the pedestals 132 and the third substrate 300. The pedestals 132 and the third substrate 300 have a function to control displacement of the weight body 131 so that it falls within a predetermined range, and serve to protect the diaphragm portion from being broken when excessive acceleration is applied to the weight body 131.

Figure 30:
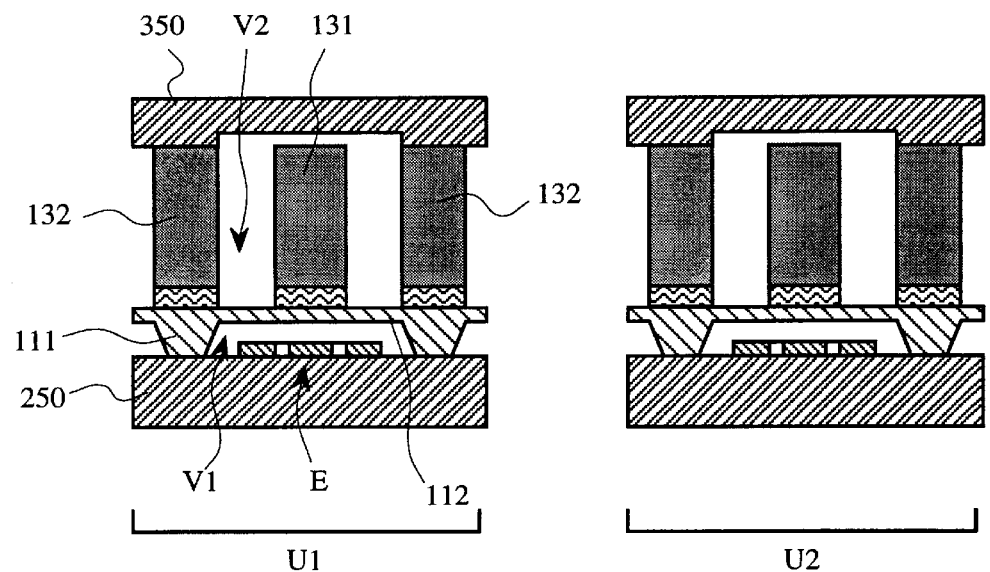
FIG. 30 is a side cross sectional view showing two independent sensor structural bodies obtained by cutting off the unit areas U1, U2 of the structure shown in FIG. 29.

When process to prepare respectively independent sensor structural bodies has been completed in this way in connection with four unit areas U1 to U4 shown in FIG. 16, processing to cut off the respective substrates 100, 200, 300 into respective unit areas keeping the state where they are bonded to each other (e.g., cutting by dicing blade). FIG. 30 is a side cross sectional view showing two independent sensor structural bodies obtained by cutting off the unit areas U1 and U2. The second substrate 200 and the third substrate 300 are respectively cut to constitute a supporting substrate 250 and a cover substrate 350. Moreover, the lower layer portion 110 of the first substrate 100 constitutes pedestal portions 111 and diaphragm portions 112, and the upper layer portion 130 constitutes weight bodies 131 and pedestals 132. Between the diaphragm 112 and the supporting substrate 250, a cavity portion V1 for capacitance element is formed. Thus, capacitance elements using the electrodes E are formed. In addition, a cavity portion V2 for weight body is formed between the weight body 131 and the pedestals 132 or the cover substrate 350.

It is to be noted that it is preferable for ensuring more sufficient flexibility to form slits S1, S2 as shown in FIG. 7 or FIG. 8 (slits S1, S2 shown are an example of the case where pedestals 20, 40 are in square form. In the case of forming annular shaped pedestal portion 111, it is preferable to allow a slit to be in circular arc form). In order to form such slits at the diaphragm portion 112, as shown in FIG. 18, it is sufficient to form a cavity portion V1 for capacitance element by etching on the lower surface of the lower layer portion 110 thereafter to further carry out processing to remove, by etching, a portion (a portion where slit is to be formed) of the upper wall surface (diaphragm portion 112) of this cavity portion V1. Since the middle layer portion 120 functions as etching stopper in the etching process with respect to this diaphragm portion 112, it is possible to form slits (still remaining in the stuffed state at this time point) penetrated in the thickness direction within a predetermined area of the diaphragm portion 112. Though the slits in stuffed state are formed on the diaphragm portion 112 at this stage, the slits are opened at the time point when the etching process from the upper direction shown in FIG. 26 is carried out.

Moreover, in the sensor structural body shown in FIG. 30, the cover substrate 350 is not necessarily required, and may be omitted in dependency upon utilization form of the sensor structural body. For example, if this sensor structural body is utilized in the state accommodated within another case, even if the cover substrate 350 does not exist, the weight body 131 is not placed in the state exposed to the external. Accordingly, in the case where this sensor structural body is used in such a utilization form, the process for bonding the third substrate 300 may be omitted.

If the sensor is manufactured by the procedure as stated above, it is possible to mass-produce more compact sensors on the commercial base. Namely, the groove formation process for forming weight bodies, pedestals and diaphragms from a single substrate can be efficiently carried out. Moreover, although mechanical processing using a dicing blade is carried out, there is no possibility that shavings may be mixed into the cavity portion V1 for capacitance element. For example, at the stage shown in FIG. 23, cutting process using a dicing blade is carried out from the upper direction. At this stage, since the bottom portions of the grooves G11 to G17 do not reach the upper surface of the diaphragm portion 112, even if, slits in the stuffed state are formed at the diaphragm portion 112, there is no possibility that shavings may fall within the cavity portion V1 for capacitance element.

In the sensor structural body shown in FIG. 30, if no slit is formed at the diaphragm portion 112, the cavity portion V1 for capacitance element is placed in sealed state. On the contrary, the cavity portion V2 for weight body is placed in the state communicating with the external (because grooves are dug over plural unit areas as shown in FIG. 24). In other words, though the cavity portion V1 for capacitance element formed below the diaphragm portion 112 is placed in tightly sealed state, the cavity portion V2 for weight body formed above the diaphragm portion 112 is in opened state. This is not preferable in carrying out measurement of high accuracy, as an error in measurement depend on temperature change is apt to take place. This is because pressure difference takes place between the upper side and the lower side of the diaphragm portion 112 by temperature change. For example, when temperature is elevated, only air within the cavity portion V1 for capacitance element is swollen, so pressure to the upper direction is applied to the diaphragm portion 112. Thus, bending of the diaphragm portion 112 would take place even under the state where no acceleration is applied. In order to avoid such bad effect, it is desirable to form a hole for air bleed at a portion of the wall surface constituting the cavity portion V1 for capacitance element.

§4 Second Embodiment of This Invention

In the above-described first embodiment, grooves were dug from the upper surface of the upper layer portion 130 of the first substrate 100 to form a weight body 131 and a pedestal 132. In the second embodiment described here, a pedestal 132 is provided by a separate substrate. If the pedestal 132 is provided by the separate substrate as described here, both the cavity portion for capacitance element formed below the diaphragm portion 112 and the cavity portion for weight body formed above the diaphragm portion 112 can be maintained in tightly closed state. The second embodiment will be described below in conformity with the actual example.

Figure 31:
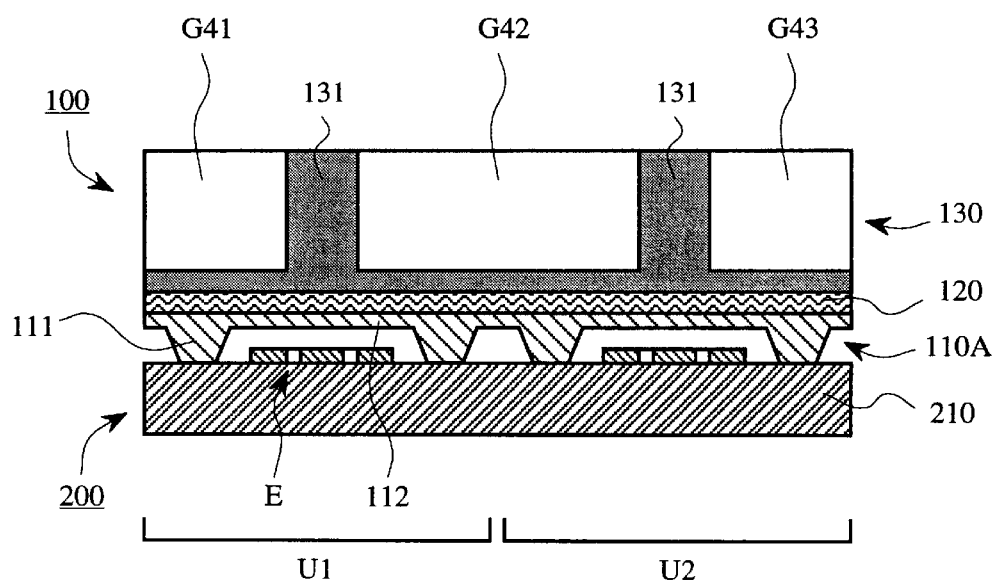
FIG. 31 is a side cross sectional view showing the state where mechanical cutting work is carried out with dicing blade to the upper surface of the structure shown in FIG. 22 to form grooves G41 to G43 of a first depth in order to carry out a second embodiment of the invention.
Figure 32:
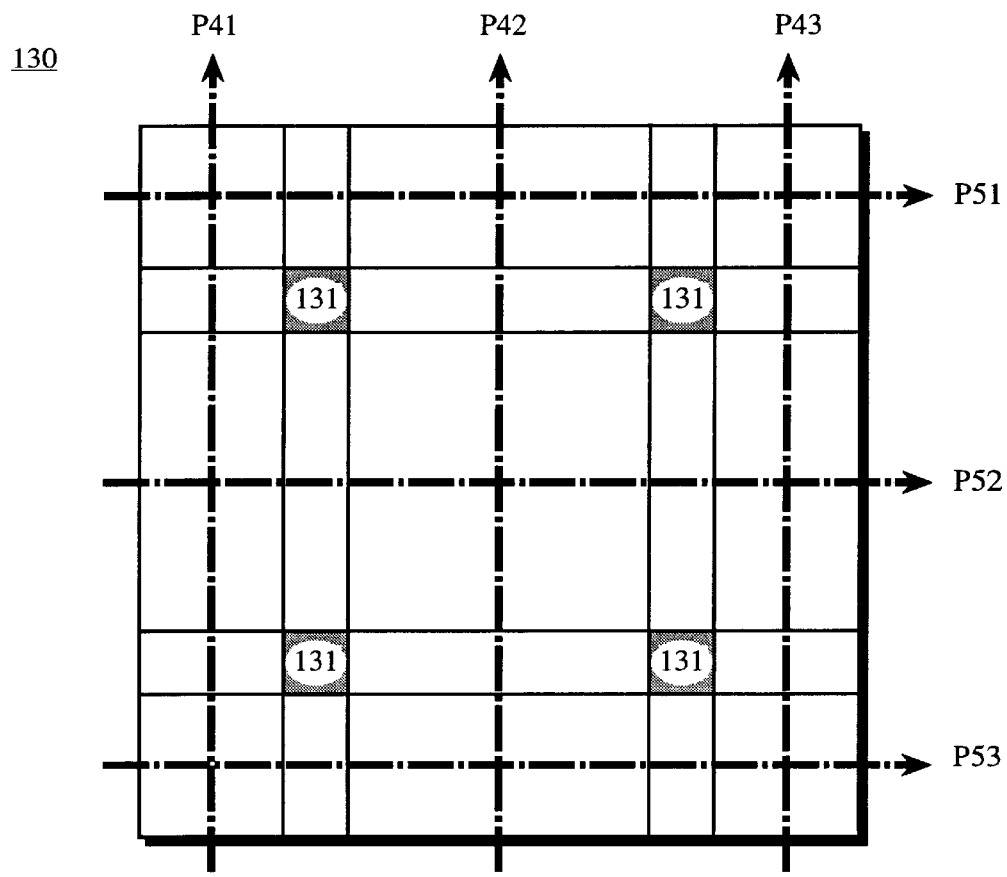
FIG. 32 is a plan view showing path of dicing blade on the upper layer portion 130 during the mechanical cutting work shown in FIG. 31.

Initially, structure shown in FIG. 22 is obtained by the process similar to the method according to the first embodiment which has been described in the chapter §3. The process up to the state of FIG. 22 is entirely the same as the previously described process. Subsequently, cutting process is implemented by the mechanical method using a dicing blade from the upper surface of the upper layer portion 130 to form grooves having a first depth. However, in this second embodiment, unlike the previously described first embodiment, a cutting process for obtaining only the weight body 131 is carried out. FIG. 31 is a side cross sectional view showing the state where the mechanical cutting process is implemented to the structure shown in FIG. 22 to form grooves of the first depth. As compared to the previously described first embodiment, grooves G41 to G43 having more broad width are formed. In order to carry out cutting machining for forming the grooves G41 to G43, it is efficient to dig grooves continuous over the plural unit areas. FIG. 32 is a plan view showing paths of a dicing blade on the upper layer portion 130 in this cutting process. The longitudinal paths P41 to P43 and the lateral paths P51 to P53 indicated by arrows of single dotted lines in the figure respectively indicate paths at the time of the cutting process using a dicing blade of a predetermined width. Eventually, the grooves G41 to G43 (shown in the side cross sectional view of FIG. 31) are formed along the longitudinal paths P41 to P43, and the grooves G51 to G53 (not shown) are formed along the lateral paths P51 to P53.

Figure 33:
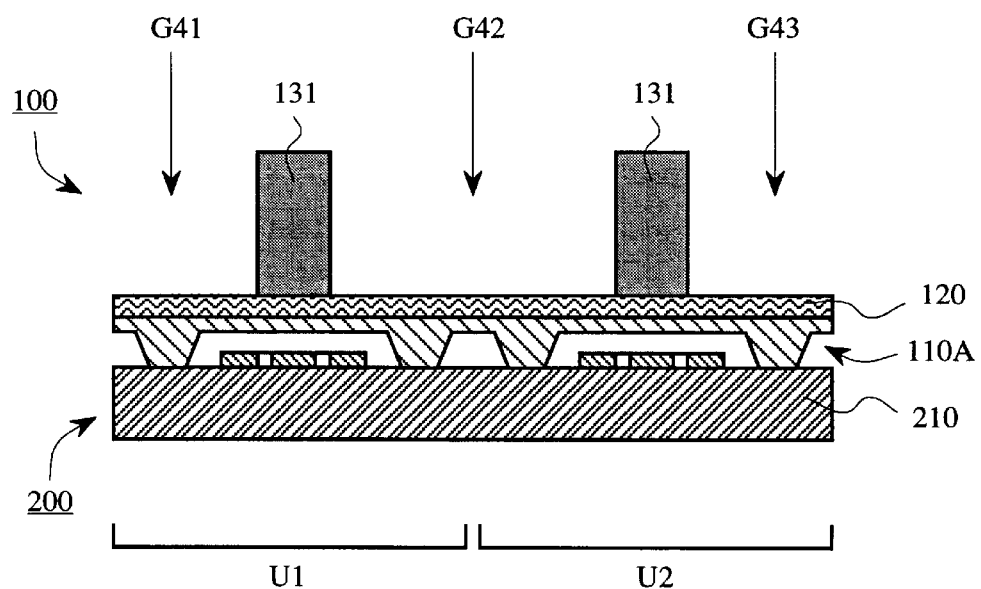
FIG. 33 is a side cross sectional view showing the state where etching process to the upper layer portion 130 of the structure shown in FIG. 31 is completed by using the first etching liquid.
Figure 34:
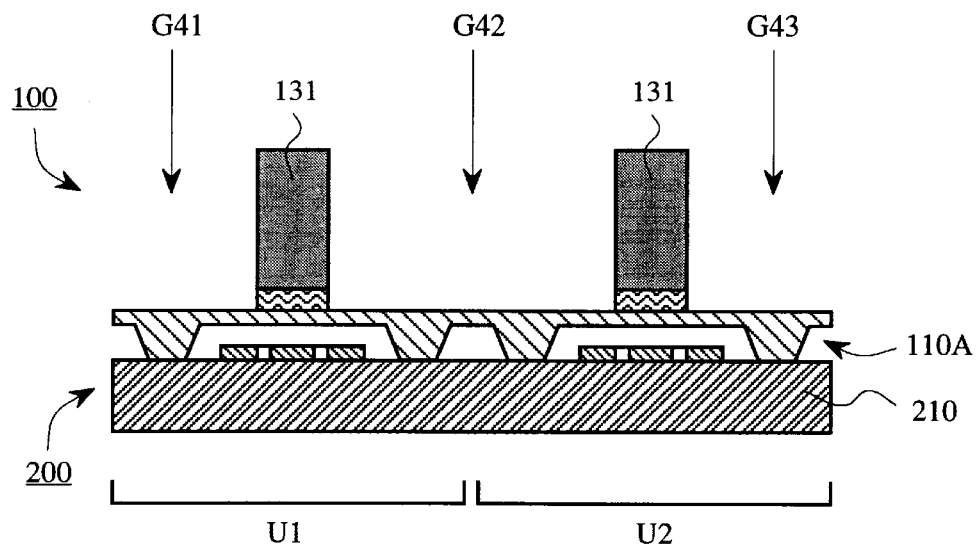
FIG. 34 is a side cross sectional view showing the state where etching process to the middle layer portion 120 of the structure shown in FIG. 33 is completed by using the second etching liquid.

In the plan view of FIG. 32, the areas indicated by implementing hatching indicate the portions which have not been on the paths of a dicing blade. These portions serve as portions constituting weight bodies 131 (respective weight bodies 131 are formed at the central portions in respective unit areas). Moreover, the portions surrounding the peripheries of the weight bodies 131, which have been on the paths of the dicing blade, ultimately constitute respective flexible portions. Further, pedestals prepared on a separate substrate are bonded in the area outside the respective flexible portions at a process which will be described later After the grooves of the first depth are formed as shown in FIG. 31, next process to dig the bottom portions of these grooves is subsequently executed so that the depths of the grooves become equal to the second depth. This digging process is carried out by two stages using two kinds of different etching liquid similarly to the above-described first embodiment. Initially, the former stage is carried out to dig the upper layer portion 130 by using the first etching liquid. FIG. 33 is a side cross sectional view showing the state where etching with respect to the upper layer portion 130 has been completed. At the bottom portions of the respective grooves G41 to G43, the upper surface of the middle layer portion 120 is exposed. Since the middle layer portion 120 functions as etching stopper, the etching process of the former stage using the first etching liquid has been substantially completed in this state. Subsequently, the etching process of the latter stage using the second etching liquid is carried out. FIG. 34 is a side cross sectional view showing the state where etching with respect to the middle layer portion 120 has been completed by using the second etching liquid. At the bottom portions of the respective grooves G41 to G43, the upper surface of the lower layer portion 110A is exposed. Since the second etching liquid has no etching selectivity with respect to the lower layer portion 110A, the etching process of the latter stage using the second etching liquid has been substantially completed in this state. Similarly to the above-described first embodiment, the depth of grooves formed by the etching process can be precisely controlled by formation of the middle layer portion 120. Of course, if the degree of progression of etching can be sufficiently controlled, the middle layer portion 120 may be omitted. In this case, it is sufficient to prepare a single silicon substrate as the first substrate 100.

Figure 35:
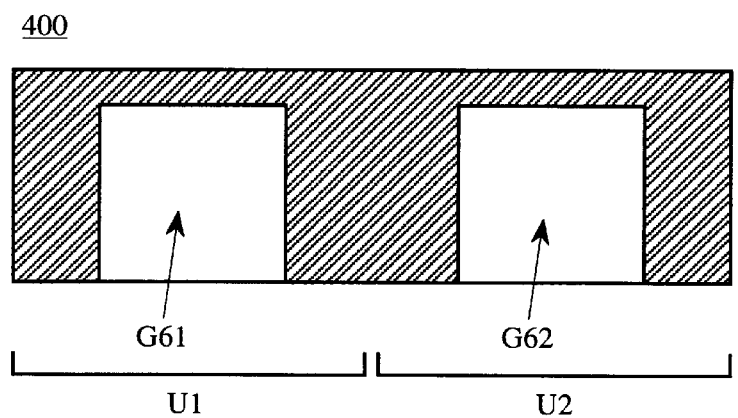
FIG. 35 is a side cross sectional view taken along 35—35 in FIG. 37 of a third substrate 400 used in the second embodiment of this invention.
Figure 36:
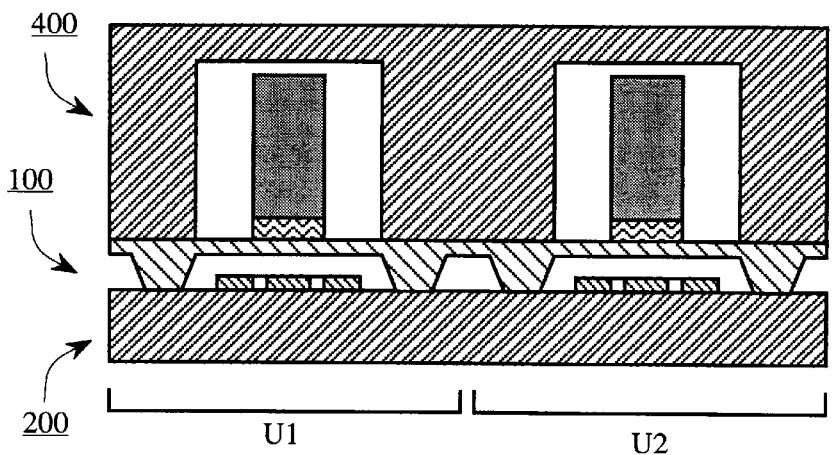
FIG. 36 is a side cross sectional view showing the state where the third substrate 400 is further bonded on the upper surface of the structure shown in FIG. 34.
Figure 37:
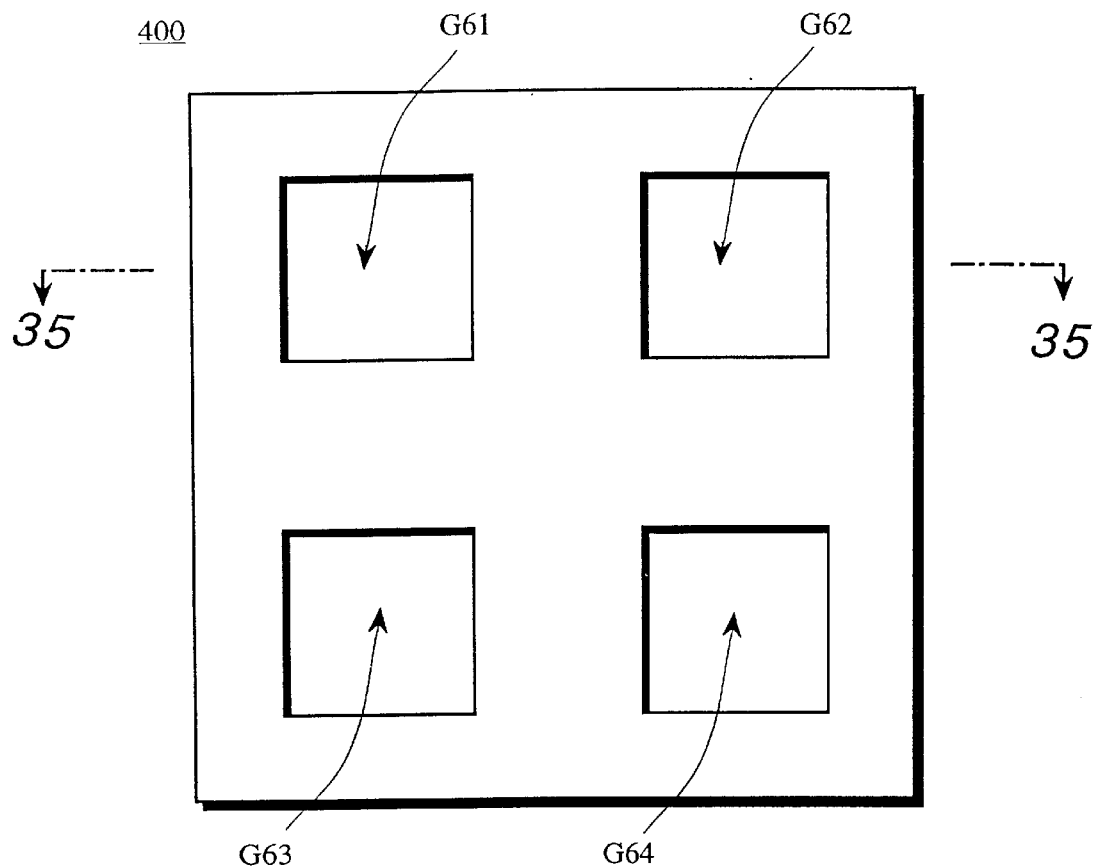
FIG. 37 is a bottom view of the third substrate 400 shown in FIG. 35.

Subsequently, as shown in the side cross sectional view of FIG. 35, there is prepared a third substrate 400 in which cavity portions G61, G62 for weight body are provided for forming space within which the weight body 131 is permitted to undergo displacement with a predetermined degree of freedom. Further, as shown in the side cross sectional view of FIG. 36, the lower surface of the third substrate 400 is bonded to the fixed area of the upper surface of the first substrate 100 (e.g., anode bonding is used) so as to cover the weight body 131 by the wall surfaces of the cavity portions G61, G62 in the state where the upper surface of the first substrate 100 and the lower surface of the third substrate 400 are opposite to each other. FIG. 37 is a bottom view of the third substrate 400. On the lower surface of the third substrate 400, cavity portions G61 to G64 for weight body are formed in the independent respective unit areas. The weight body 131 is caused to undergo displacement within the cavity portions G61 to G64. While glass substrate is used in this embodiment as the third substrate 400, it may be constituted with other material.

Figure 38:
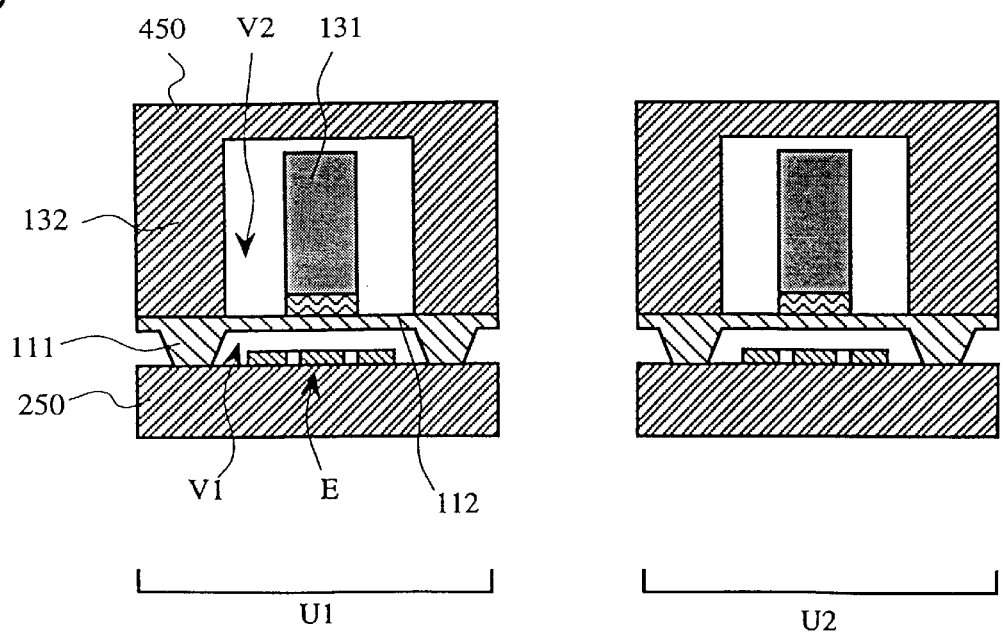
FIG. 38 is a side cross sectional view showing two independent sensor structural bodies obtained by cutting off the unit areas U1, U2 of the structure shown in FIG. 36.

When the process for preparing respectively independent sensor structural bodies has been completed with respect to the four unit areas U1 to U4 shown in FIG. 16 in this way, a process for cutting off (e.g., cutting by a dicing blade) the respective substrates 100, 200, 400 is finally carried out to separate respective unit areas keeping the state where they are connected (bonded) to each other. FIG. 38 is a side cross sectional view showing two independent sensor structural bodies obtained by cutting off the unit areas U1, U2. The second substrate 200 and the third substrate 400 are respectively cut to constitute supporting substrates 250 and cover substrates 450. Moreover, the lower layer portion 110 of the first substrate 100 constitutes pedestal portions 111 and diaphragm portions 112, and the upper layer portion 130 constitutes the weight bodies 131. Between the diaphragm portion 112 and the supporting substrate 250, a cavity portion V1 for capacitance element is formed. Thus, capacitance elements using the electrodes E are formed. In addition, between the weight body 131 and the cover substrate 450, a cavity portion V2 for weight body is formed.

It is to be noted that, also in the sensor structural body shown in FIG. 38, the cover substrate 450 is not necessarily required, and may be omitted in dependency upon utilization form of the sensor structural body. Namely, if this sensor structural body is utilized in the state accommodated within another case, there is no possibility that there results the state where the weight body 131 is exposed to the external even if there is no cover substrate 450. Accordingly, in the case where the sensor structural body is used in such a utilization form, the step for bonding the third substrate 400 may be omitted.

However, the sensor structural body according to the second embodiment has an advantage to be able to hold the cavity portion V2 for weight body in sealed state as compared to the previously described sensor structural body according to the first embodiment. Therefore, from a viewpoint of practical use, it is preferable to form the cover substrate 450 by using the third substrate 400. Moreover, it is preferable for the purpose of ensuring sufficient flexibility to form slits penetrated in the thickness direction in the diaphragm portion 112 as previously described. When slits are formed at the diaphragm portion 112, the cavity portion V1 for capacitance element and the cavity portion V2 for weight body are placed in the state where they are connected through these slits in FIG. 38. Accordingly, an error in the measurement by temperature change is difficult to take place. Namely, in the sensor structural body according to the second embodiment, the cavity portion V1 for capacitance element and the cavity portion V2 for weight body can both maintain the sealed state. Accordingly, even if air of the inside is swollen or contracted by temperature change, there is no pressure difference between the upper and the lower portions with respect to the diaphragm portion 112. For this reason, there is no possibility that a great measurement error may take place.

It is to be noted that, in order to realize measurement of higher accuracy, it is desirable to carry out vacuum suction for sealing the cavity portion V1 for capacitance element and the cavity portion V2 for weight body from the external. In more practical sense, if the process for joining (bonding) the first substrate 100 and the second substrate 200 (the process for sealing the cavity portion V1 for capacitance element) and the process for joining (bonding) the first substrate 100 and the third substrate 400 (the process for sealing the cavity portion V2 for weight body) are carried out by the anode bonding method within a vacuum chamber in which suction has been carried out, the cavity portion V1 for capacitance element and the cavity portion V2 for weight body can be ultimately held in the vacuum state. Thus, environment suitable for carrying out high accuracy measurement can be realized. Particularly, in the case where this sensor structural body is used as an angular velocity sensor, it is necessary to oscillate the weight body 131 at a predetermined resonant frequency within the cavity portion V2. If the degree of vacuum within the cavity portion V2 is caused to be high, a Q value of resonance (sharpness value) becomes high. For this reason, detection sensitivity of the angular velocity can be improved.

It is to be noted that, also in the manufacturing method according to the second embodiment, there is no possibility that while machining process using a dicing blade is carried out, shavings may be mixed into the cavity portion V1 for capacitance element. For example, at the stage shown in FIG. 31, cutting process using a dicing blade is carried out in the lower direction. However, since the bottom portions of the grooves G41 to G43 do not reach the upper surface of the diaphragm portion 112 at this stage, even if slits are formed at the diaphragm portion 112, it still remains in the stuffed state. For this reason, there is no possibility that shavings may fall within the cavity portion V1 for capacitance element.

Figure 39:
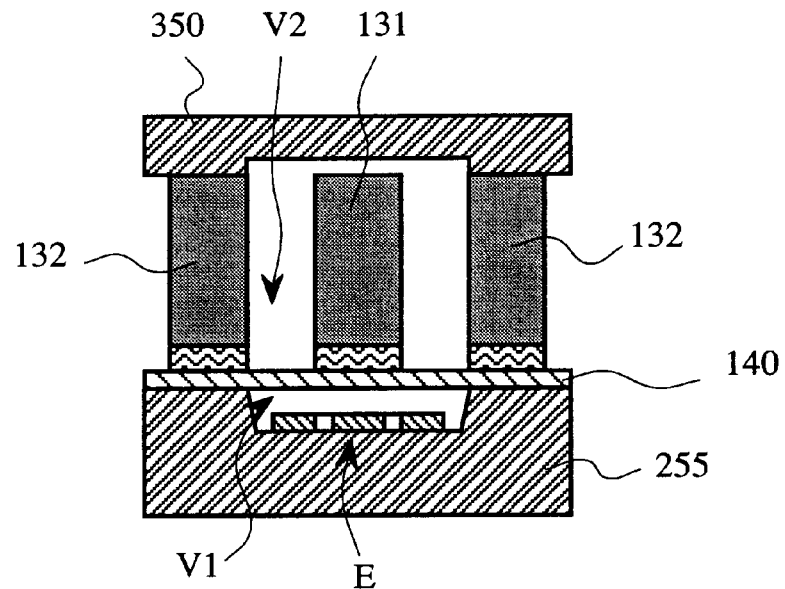
FIG. 39 is a side cross sectional view showing a structure in which a cavity portion V1 for the capacitance element is formed on the supporting substrate 250 of the sensor structural body shown in FIG. 30.

It is to be noted that while, in all of the embodiments which have been described until now, the lower surface of the first substrate 100 is processed to thereby form a cavity portion V1 for capacitance element, the upper surface of the second substrate 200 may be processed in a manner opposite to the above to thereby form a cavity portion V1 for capacitance element. FIG. 39 is a side cross sectional view showing the example where the second substrate 200 is processed in this way. It is seen that, as compared to the sensor structural body shown in FIG. 30, a groove is formed on the supporting substrate 255 and a cavity portion V1 for capacitance element is formed by this groove. The lower electrodes E are formed on the bottom portion of this groove. The lower layer portion of the first substrate 100 forms a single flexible substrate 140. In short, as far as a cavity portion V1 for capacitance element can be formed between the first substrate 100 and the second substrate 200 in the working and flexible areas, a process for providing a cavity may be carried out with respect to either the lower surface of the first substrate 100, or the upper surface of the second substrate 200. Further the process may be carried out with respect to both the surfaces.

§5 Application to Sensor Using Piezo Resistance Elements

While the embodiments where this invention is applied to the sensor using the capacitance elements have been described above, this invention may be similarly applied to the sensor using the piezo resistance elements. The sensor using the piezo resistance elements is realized by replacing the capacitance elements in the above described sensors by the piezo resistance elements.

Figure 40:
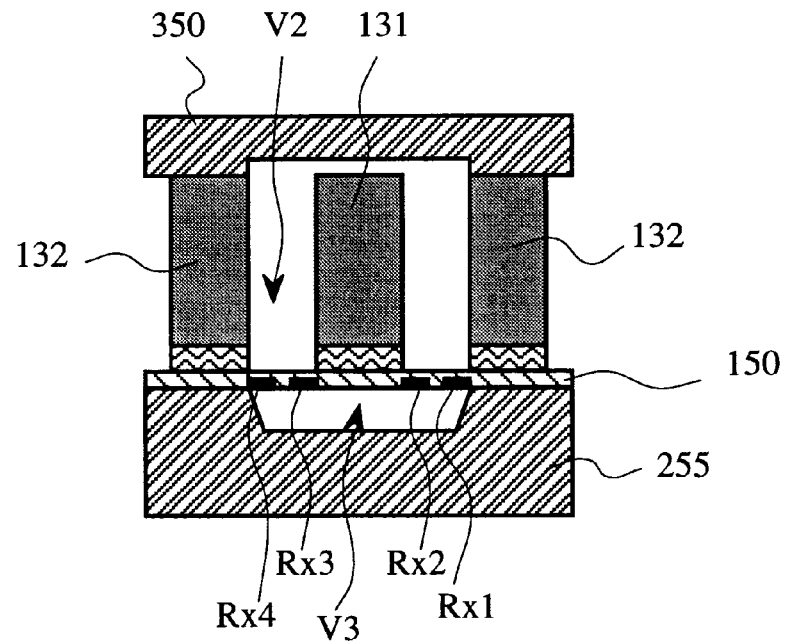
FIG. 40 is a side cross sectional view showing a sensor structural body using piezo resistance elements in place of capacitance elements.

FIG. 40 is a side cross sectional view showing a sensor structural body which is realized by replacing the capacitance elements in the sensor shown in FIG. 39 with the piezo resistance elements. In the sensor structural body shown in FIG. 39, the flexible substrate 140 is made of conductive material (e.g., impurity added silicon), and the capacitance elements constituted by the flexible substrate 140 and the lower electrodes E were formed within the cavity portion V1 for capacitance element. Further, when the weight body 131 is caused to undergo displacement by action of acceleration, bending takes place in the flexible substrate 140. As a result, change takes place in the electrostatic capacitances of the capacitance elements. On the contrary, in the sensor structural body shown in FIG. 40, a flexible substrate 150 consists of an n-type single crystal silicon substrate wherein p-type piezo resistance elements Rx1 to Rx4 are formed on the substrate. Of course, the relation of n-type and p-type in the above-described configuration may be opposite to the above. Piezo resistance elements have the property in which resistance value changes on the basis of mechanical deformation. When the weight body 131 is caused to undergo displacement by action of an acceleration, bending takes place in the flexible substrate 150. Thus, change takes place in the resistance value of the piezo resistance elements. By measuring change of this resistance value, an acceleration applied to the weight body 131 can be detected. As shown, a cavity portion V3 for resistance element is formed by the groove dug on the upper surface of the supporting substrate 255. Thus, free space required for allowing the piezo resistance elements to carry out mechanical deformation is ensured.

Figure 41:
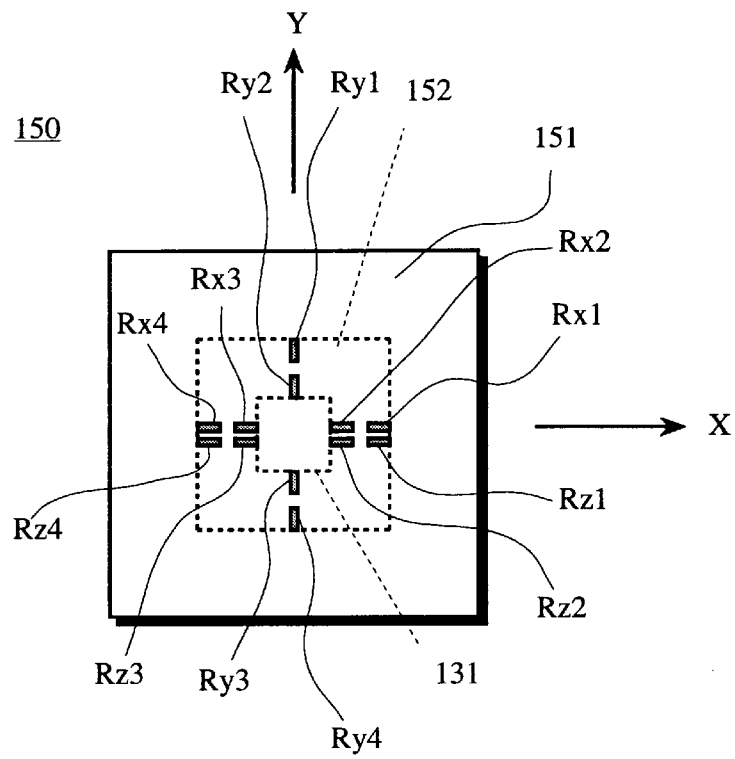
FIG. 41 is a bottom view of the flexible substrate 150 in the sensor structural body shown in FIG. 40.
Figure 42:
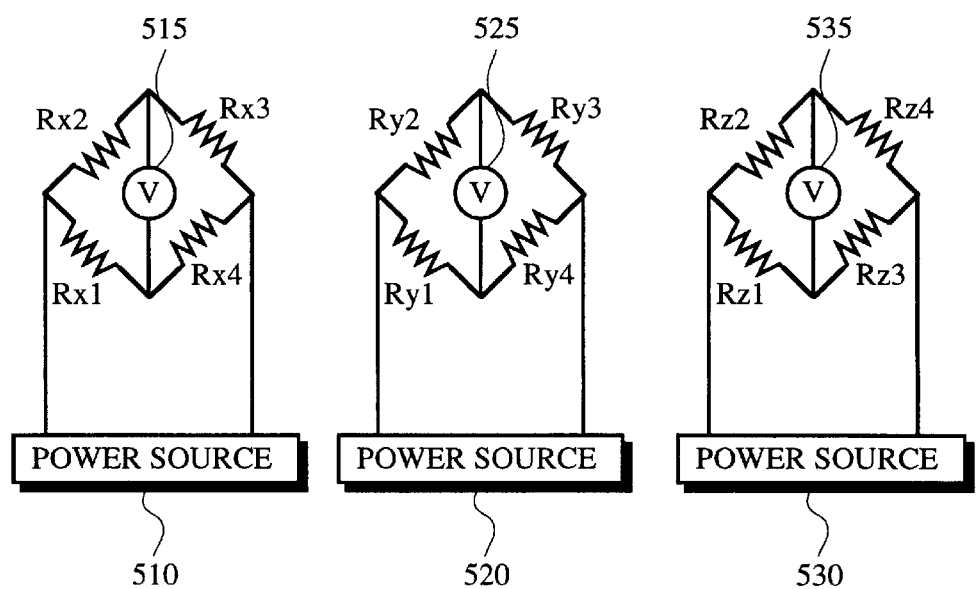
FIG. 42 is a circuit diagram of detection circuits used in the case where acceleration sensor is constituted by using the sensor structural body shown in FIG. 40.

FIG. 41 is a bottom view of the flexible substrate 150 in the sensor structural body shown in FIG. 40. As shown in FIG. 41, the flexible substrate 150 is composed of a peripheral fixed portion 151 and a diaphragm portion 152 surrounded by the fixed portion 151, and the weight body 131 (indicated by broken lines) is joined to the center of the diaphragm portion 152. In this embodiment, twelve sets of piezo resistance elements in total are formed as shown. Four sets of piezo resistance elements Rx1 to Rx4 arranged on the X-axis are used for detection of the X-axis directional component of acceleration applied to the weight body 131, four sets of piezo resistance elements Ry1 to Ry4 arranged on the Y-axis are used for detection of the Y-axis directional component of acceleration applied to the weight body 131, and four sets of piezo resistance elements Rz1 to Rz4 arranged along the side of the X-axis are used for detection of the Z-axis directional component of acceleration applied to the weight body 131. Namely, as shown in the circuit diagram of FIG. 42, bridges are constituted by these twelve sets of piezo resistance elements so that the respective acceleration components can be detected by measuring bridge equilibrium voltages appearing on the voltage meters 515, 525, 535 in the state where respective predetermined voltages are applied from the power supplies 510, 520, 530.

Figure 43:
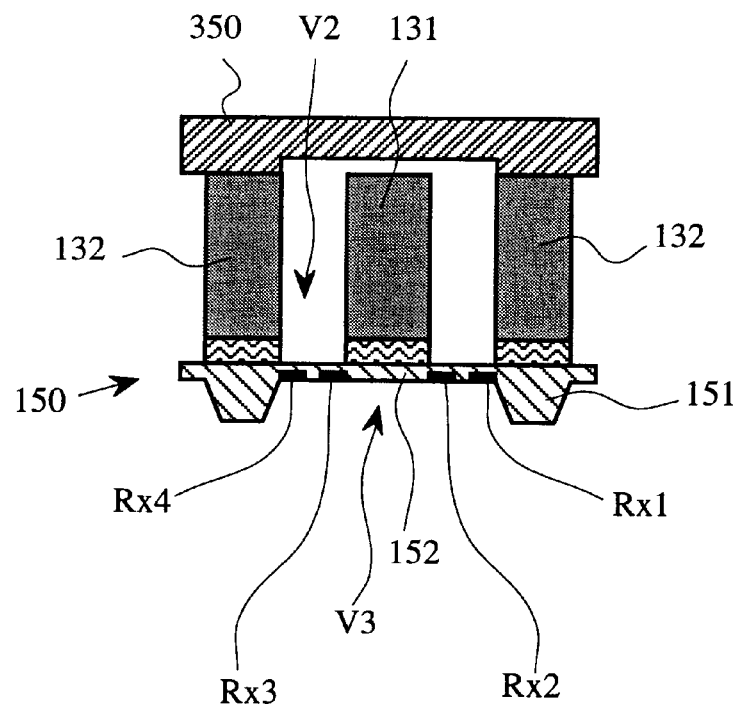
FIG. 43 is a side cross sectional view showing a modified example of the sensor structural body shown in FIG. 40.

It is to be noted that a structure as shown in FIG. 43 may be employed in place of the structure shown in FIG. 40. In the sensor structural body shown in FIG. 43, the fixed portion 151 formed at the peripheral portion of the flexible substrate 150 functions as a pedestal to support the diaphragm portion 152 and a space surrounded by the fixed portion 151 functions as a cavity portion V3 for resistance element. In such a structure, the supporting substrate 255 is not necessarily required. It is sufficient to accommodate the sensor structural body shown in FIG. 43 within a sensor casing as it is to secure the fixed portion 151 functioning as a pedestal on the bottom surface of the sensor casing. In addition, the cover substrate 350 may be omitted.

Figure 44:
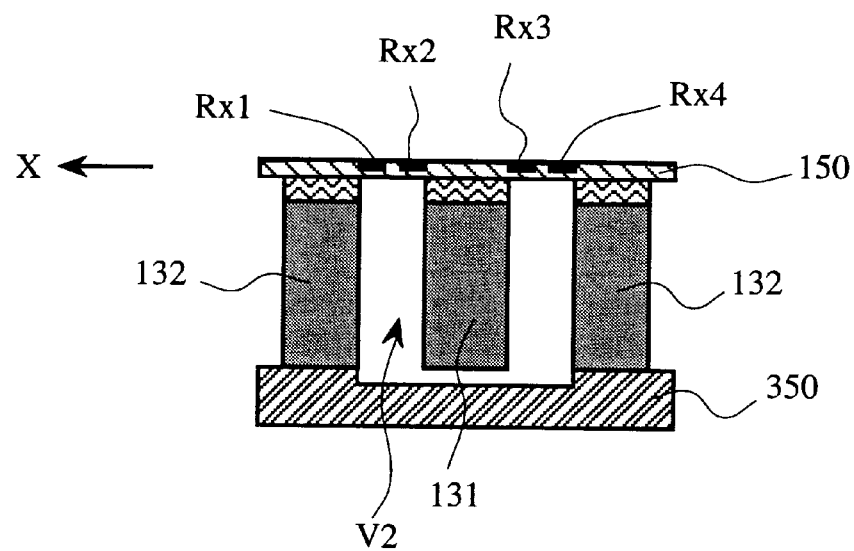
FIG. 44 is a side cross sectional view showing another modified example of the sensor structural body shown in FIG. 40.

FIG. 44 is a side cross sectional view showing a further different modified example of the sensor structural body shown in FIG. 40. This modified example is obtained by omitting the supporting substrate 255 from the sensor structural body shown in FIG. 40, though the sensor of FIG. 44 is illustrated in the inverted state with respect to upper and lower directions. If the sensor structural body shown in FIG. 44 is accommodated into a sensor casing as it is and the cover substrate 350 is secured on the bottom surface of the sensor casing, this sensor structural body can be utilized as it is.

The manufacturing process of such sensor structural bodies utilizing piezo resistance elements is substantially the same as the manufacturing process of the sensor structural bodies utilizing capacitance elements which has been described as above. Initially, first substrate 100 (called a body substrate in this case) as shown in FIG. 17 is prepared and grooves are formed on the lower surface as shown in FIG. 18 (a cavity portion V3 for resistance element is formed in place of the cavity portion V1 for capacitance element shown in FIG. 18). It is to be noted that this process is unnecessary in the case where the structure shown in FIG. 40 or FIG. 44 is employed. It is further to be noted that necessary number of piezo resistance elements are assumed to be formed on the lower layer portion 110. Accordingly, it is necessary to constitute the lower layer portion 110 by material having insulating property. In more practical sense, it is sufficient to constitute the lower layer portion 110 by n-type silicon single crystal layer and to carry out a process for diffusing p-type impurity with respect to the necessary area of the lower layer portion so that piezo resistance elements are formed as impurity diffused areas. In this case, it is preferable to implement etching for forming slits as shown in FIG. 7 or FIG. 8 with respect to the lower layer portion 110. In addition, it is desirable to form slits in the area where piezo resistance elements are not formed, and to dispose the piezo resistance elements in the area where stress takes place to more degree by action of acceleration within the flexible area (e.g., the area 32B in the example of FIG. 8).

Then the supporting substrate (substrate corresponding to the second substrate 200 shown in FIG. 22, which is ultimately used as the supporting substrate 255 shown in FIG. 40) is joined as occasion demands to the lower surface of the body substrate prepared in this way. Next, the processes shown in FIGS. 23 to 26 are carried out to form the weight bodies 131 and the pedestals 132 from the respective portions of the body substrate 100. Subsequently the third substrate 300 (called a cover substrate in this example) is joined as shown in FIG. 29 as occasion demands. Alternatively, the processes shown in FIGS. 31 to 34 in place of the processes shown in FIGS. 23 to 26 may be carried out to form the weight bodies 131 from the respective portions of the body substrate 100 and join the third substrate 400 (cover substrate) as shown in FIG. 36 as occasion demands.

As stated above, in accordance with the manufacturing method for sensor according to this invention, more compact sensors can be mass-produced on the commercial base.

§6 Method Without Using Mechanical Digging Process

In the above described embodiments, mechanical digging process is applied to the first substrate 100 so that the grooves having a first depth are to be formed. For example, the first substrate 100 as shown in FIG. 22 is mechanically dug by a dicing blade from the upper surface so that grooves G11 to G17 having a first depth are formed as shown in FIG. 23. Then the etching process is carried out until the depth of the grooves becomes the second depth as shown in FIG. 26. However, it is not limited to using mechanical digging process to form the grooves of the first depth.

Recently, RIE (Reactive Ion Etching) is getting popular as a method of processing a substrate. The RIE method is practically useful for digging grooves perpendicular to the substrate surface and has an advantage that the etching speed thereof is relatively high. Therefore, the mechanical digging process using a dicing blade in the above described embodiments can be replaced by RIE digging process as explained below.

When the substrates 100 and 200 are bonded as shown in FIG. 22, the Reactive Ion Etching method is applied to the upper surface of the substrate 100 to form grooves. Since the upper layer portion 130 and the middle layer portion 120 are layers consisting of materials having different etching characteristics from each other, as mentioned before, the RIE process is to be stopped when the upper surface of the middle layer portion 120 is exposed as shown in FIG. 25. Therefore, in this embodiment, the depth of the grooves G11 to G17 shown in FIG. 25 is named as a first depth. Then the etching process to the middle layer portion 120 is carried out as mentioned before so that the depth of the grooves G11 to G17 becomes a second depth as shown in FIG. 26.

In practice, the RIE process for digging grooves of the first depth and the succeeding etching process for further digging the grooves to the second depth can be carried out in succession using a same etching chamber. In other words, keeping the substrates 100 and 200 in the same etching chamber, first etching gas is introduced in the chamber to carry out the RIE process and then second etching gas is introduced in the chamber to carry out the succeeding etching process.

As described above, in order to obtain grooves of the first depth, etching process such as RIE may be used instead of the mechanical digging process.

What is claimed is:

1. A method of manufacturing a sensor utilizing change of electrostatic capacitance, the method comprising:

a step of preparing a first substrate where a working area is defined at a central portion thereof, a flexible area is defined at a periphery of the working area and a fixed area is defined at a periphery of the flexible area, and preparing a second substrate for being disposed in a manner opposite to a lower surface of the first substrate;

a step of implementing processing to either the lower surface of the first substrate or an upper surface of the second substrate, or both of the surfaces so that a cavity portion of a capacitance element can be formed between said working and flexible areas of the first substrate and an opposite ares of the second substrate;

a step of providing electrodes so that the capacitance element can be formed between the lower surface of the first substrate constituting an upper wall surface of said cavity portion for said capacitance element and the upper surface of the second substrate constituting a lower wall surface of said cavity portion for the capacitance element;

a step of joining the lower surface of the fixed area of the first substrate to the upper surface of the second substrate so as to form said cavity portion for said capacitance element;

a step of digging a portion of at least the flexible area of the first substrate from the upper surface to thereby form grooves having a first depth; and a step of implementing etching to bottom portions of the grooves until their depths reach a second depth so that a flexible portion is formed by a portion of the flexible area of the first substrate, a weight body is formed by a portion of the working area of the first substrate and a pedestal is formed by a portion of the fixed area of the first substrate thus to form a sensor structural body wherein bending takes place in the flexible portion on the basis of force applied to the weight body;

to manufacture a sensor having a function to measure physical action on the basis of change of electrostatic capacitance values of the capacitance elements.

2. A method of manufacturing a sensor as set forth in claim 1, the method further comprising:
  a step of preparing a third substrate for being disposed in a manner opposite to the upper surface of the first substrate; and
  a step of joining an upper surface of the pedestal to a lower surface of the third substrate in the state where a space is provided between the pedestal and the third substrate, the weight body being permitted to undergo displacement with a degree of freedom within said space.

3. A method of manufacturing a sensor as set forth in claim 1:
  wherein etching is implemented to either the lower surface of the first substrate or the upper surface of the second substrate to thereby carry out processing for forming the cavity portion for capacitance element.

4. A method of manufacturing a sensor as set forth in claim 1:
  wherein a lower layer portion of the first substrate is constituted by a conductive layer and the cavity portion for said capacitance element is provided in said lower layer portion so that the upper wall surface of said cavity portion for the capacitance element has conductivity to constitute an electrode of the capacitance element by said upper wall surface.

5. A method of manufacturing a sensor as set forth in claim 4:
  wherein a substrate having three layer structure of an upper layer portion, a middle layer portion and a lower layer portion is used as the first substrate, and the middle layer portion is constituted by material having an etching characteristic different from that of the upper layer portion and the lower layer portion;
  wherein grooves shallower than a thickness of the upper layer portion are dug as the grooves of the first depth; and
  wherein when the bottom portions of the grooves formed on the upper layer portion are dug to the second depth, two stages of a former stage and a latter stage are carried out so that the upper layer portion is dug by using first etching liquid or gas in the former stage and the middle layer portion is dug by using second etching liquid or gas in the latter stage.

6. A method of manufacturing a sensor as set forth in claim 5:
  wherein, after the cavity portion for the capacitance element is formed on the lower layer portion, a portion of the upper wall surface of the cavity portion for the capacitance element is further removed by etching so as to form a slit penetrated through the lower layer portion to allow the flexible portion to have sufficient flexibility in measurement.

7. A method of manufacturing a sensor as set forth in claim 5:
  wherein the upper layer portion is constituted by a silicon, the middle layer portion is constituted by silicon compound, and the lower layer portion is constituted by silicon having conductivity by addition of impurity.

8. A method of manufacturing a sensor as set forth in claim 5:
  wherein the middle layer portion is constituted by insulating material.

9. A method of manufacturing a sensor as set forth in claim 1:
  wherein plural unit areas are defined on the first substrate or the body substrate, and a working area, a flexible area and a fixed area are defined for the respective unit areas, at a central portion of the unit area, at a periphery of the working area and at a periphery of the flexible area; and
  wherein individual steps are executed for the respective unit areas to form respectively independent sensor structural bodies in the respective unit areas thereafter to cut the substrates into the respective unit areas so as to manufacture plural independent sensors.

10. A manufacturing method for sensor as set forth in claim 9:
  wherein when the grooves having the first depth are dug, grooves continuous over the plural unit areas are dug.

11. A method of manufacturing a sensor as set forth in claim 1:
  wherein the grooves having the first depth are formed by mechanically digging the upper surface of the first substrate.

12. A method of manufacturing a sensor utilizing change of electrostatic capacitance, the method comprising:
  a step of preparing a first substrate where a working area is defined at a central portion thereof, a flexible area is defined at a periphery of the working area and a fixed area is defined at a periphery of the flexible area, and preparing a second substrate for being disposed in a manner opposite to a lower surface of the first substrate;
  a step of implementing processing to either the lower surface of the first substrate or an upper surface of the second substrate, or both of the surfaces so that a cavity portion for capacitance element can be formed between said working and flexible areas of the first substrate and an opposite area of the second substrate;
  a step of providing electrodes so that capacitance element can be formed between a surface of the first substrate constituting an upper wall surface of said cavity portion for said capacitance element and a surface of the second substrate constituting a lower wall surface of said cavity portion for said capacitance element;
  a step of joining the lower surface of the fixed area of the first substrate to the upper surface of the second substrate so as to form said cavity portion for said capacitance element;
  a step of digging the fixed area and the flexible area of the first substrate from the upper surface to thereby form grooves having a first depth; and
  a step of implementing etching to bottom portions of the grooves until their depths reach a second depth so that a flexible portion is formed by a portion of the flexible area of the first substrate and a weight body is formed by a portion of the working area of the first substrate thus to form a sensor structural body wherein bending takes place in the flexible portion on the basis of force applied to the weight body;
  to manufacture a sensor having a function to measure physical action on the basis of change of electrostatic capacitance values of the capacitance element.

13. A method of manufacturing a sensor as set forth in claim 12, the method further comprising:
  a step of preparing a third substrate, a cavity portion for weight body being provided on a lower surface of said third substrate for forming a space within which the weight body is permitted to undergo displacement with a degree of freedom; and a step of joining the lower surface of the third substrate to the fixed area of an upper surface of the first substrate so as to cover the weight body by a wall surface of said cavity portion for weight body.

14. A method of manufacturing a sensor as set forth in claim 13:

wherein the cavity portion for said capacitance element and the cavity portion for the weight body have a structure which can be sealed from the exterior and both the cavity portions are sealed while carrying out vacuum suction.

15. A method of manufacturing a sensor as set forth in claim 12:

wherein etching is implemented to either the lower surface of the first substrate or the upper surface of the second substrate to thereby carry out processing for forming the cavity portion for the capacitance element.

16. A method of manufacturing a sensor as set forth in claim 12:

wherein a lower layer portion of the first substrate is constituted by conductive layer and the cavity portion for the capacitance element is provided in said lower layer portion so that the upper wall surface of said cavity portion for the capacitance element has conductivity to constitute an electrode of the capacitance elements by said upper wall surface.

17. A method of manufacturing a sensor as set forth in claim 16:

wherein a substrate having three layer structure of an upper layer portion, a middle layer portion and a lower layer portion is used as the first substrate, and the middle layer portion is constituted by material having an etching characteristic different from that of the upper layer portion and the lower layer portion;

wherein grooves shallower than a thickness of the upper layer portion are dug as the grooves of the first depth; and wherein when the bottom portions of the grooves formed on the upper layer portion are dug to the second depth, two stages of a former stage and a latter stage are carried out so that the upper layer portion is dug by using first etching liquid or gas in the former stage and the middle layer portion is dug by using second etching liquid or gas in the latter stage.

18. A method of manufacturing a sensor as set forth in claim 17:

wherein, after the cavity portion for the capacitance element is formed on the lower layer portion, a portion of the upper wall surface of the cavity portion for capacitance element is further removed by etching so as to form a slit penetrated through the lower layer portion to allow the flexible portion to have sufficient flexibility in measurement.

19. A method of manufacturing a sensor as set forth in claim 17:

wherein the upper layer portion is constituted by silicon, the middle layer portion is constituted by a silicon compound, and the lower layer portion is constituted by silicon having conductivity by addition of a impurity.

20. A method of manufacturing a sensor as set forth in claim 17:

wherein the middle layer portion is constituted by insulating material.

21. A method of manufacturing a sensor as set forth in claim 12:

wherein plural unit areas are defined on the first substrate or the body substrate, and a working area, a flexible area and a fixed area are defined for the respective unit areas, at a central portion of the unit area, at a periphery of the working area and at a periphery of the flexible area; and wherein individual steps are executed for the respective unit areas to form respectively independent sensor structural bodies in the respective unit areas thereafter to cut the substrates into the respective unit areas so as to manufacture plural independent sensors.

22. A manufacturing method for sensor as set forth in claim 21:

wherein when the grooves having the first depth are dug, grooves continuous over the plural unit areas are dug.

23. A method of manufacturing a sensor as set forth in claim 12:

wherein the grooves having the first depth are formed by mechanically digging the upper surface of the first substrate.

24. A method of manufacturing a sensor utilizing a piezo resistance element, the method comprising:

a step of preparing a body substrate wherein a working area is defined at a central portion, a flexible area is defined at a periphery of the working area, and a fixed area is defined at a periphery of the flexible area;

a step of forming piezo resistance elements in the flexible area on a lower surface of the body substrate so that resistance values of said piezo resistance elements change on the basis of mechanical deformation;

a step of digging a portion of at least the flexible area of the body substrate from an upper surface to thereby form grooves having a first depth; and a step of implementing etching to bottom portions of the grooves until their depths reach a second depth so that a flexible portion is formed by a portion of the flexible area of the body substrate, a weight body is formed by a portion of the working area of the body substrate and a pedestal is formed by a portion of the fixed area of the body substrate thus to form a sensor structural body wherein bending takes place in the flexible portion on the basis of force applied to the weight body;

to manufacture said sensor having a function to measure physical action on the basis of change of resistance values of the piezo resistance elements.

25. A method of manufacturing a sensor as set forth in claim 24, the method further comprising:

a step of preparing a cover substrate for being disposed in a manner opposite to the upper surface of the body substrate; and a step of joining an upper surface of the body substrate to a lower surface of the cover substrate in the state where a space is provided between the upper surface of the body substrate and the lower surface of the cover substrate, the weight body being permitted to undergo displacement with degree of freedom within said space.

26. A method of manufacturing a sensor as set forth in claims 24, the method further comprising:

a step of preparing a supporting substrate for being disposed in a manner opposite to the lower surface of the body substrate;

a step of implementing processing to either the lower surface of the body substrate or an upper surface of the supporting substrate, or both of the surfaces so that a cavity portion said resistance element can be formed between said working and flexible areas of the body substrate and an opposite area of the supporting substrate; and a step of joining the lower surface of the fixed area of the body substrate to the upper surface of the supporting substrate so as to form said cavity portion said resistance element.

27. A method of manufacturing a sensor as set forth in claim 24:

wherein a substrate having three layer structure of an upper layer portion, a middle layer portion and a lower layer portion is used as the body substrate, and the middle layer portion is constituted by material having an etching characteristic different from that of the upper layer portion and the lower layer portion;

wherein grooves shallower than a thickness of the upper layer portion are dug as the grooves of the first depth; and wherein when the bottom portions of the grooves formed on the upper layer portion are dug to the second depth, two stages of a former stage and a latter stage are carried out so that the upper layer portion is dug by using first etching liquid or gas in the former stage and the middle layer portion is dug by using second etching liquid or gas in the latter stage.

28. A method of manufacturing a sensor as set forth in claims 27:

wherein the piezo resistance element is to be provided in the lower layer portion and there is further provided a step of removing by etching a portion of an area where the piezo resistance element is not formed of the lower layer portion so as to form a slit penetrated through the lower layer portion to allow the flexible portion to have sufficient flexibility in measurement.

29. A method of manufacturing a sensor as set forth in claim 27:

wherein the upper layer portion and the lower layer portion are constituted by silicon, the middle layer portion is constituted by silicon oxide and the piezo resistance elements are constituted by silicon having conductivity by addition of impurity.

30. A method of manufacturing a sensor as set forth in claim 24:

wherein plural unit areas are defined on the first substrate or the body substrate, and a working area, a flexible area and a fixed area are defined for the respective unit areas, at a central portion of the unit area, at a periphery of the working area and at a periphery of the flexible area; and wherein individual steps are executed for the respective unit areas to form respectively independent sensor structural bodies in the respective unit areas thereafter to cut the substrates into the respective unit areas so as to manufacture plural independent sensors.

31. A method manufacturing method for sensor as set forth in claim 30:

wherein when the grooves having the first depth are dug, grooves continuous over the plural unit areas are dug.

32. A method of manufacturing a sensor as set forth in claim 24:

wherein the grooves having the first depth are formed by mechanically digging the upper surface of the first substrate.

33. A method of manufacturing a sensor utilizing a piezo resistance elements, the method comprising:

a step of preparing a body substrate wherein a working area is defined at a central portion, a flexible area is defined at a periphery of the working area, and a fixed area is defined at a periphery of the flexible area;

a step of forming piezo resistance elements in the flexible area on a lower surface of the body substrate so that resistance values of said piezo resistance elements change on the basis of mechanical deformation;

a step of digging the fixed area and the flexible area of the body substrate from an upper surface to thereby form grooves having a first depth; and a step of implementing etching to bottom portions of the grooves until their depths reach a second depth so that a flexible portion is formed by a portion of the flexible area of the body substrate and a weight body is formed by a portion of the working area of the body substrate thus to form a sensor structural body wherein bending takes place in the flexible portion on the basis of force applied to the weight body;

to manufacture said sensor having a function to measure physical action on the basis of change of said resistance values of the piezo resistance elements.

34. A method of manufacturing a sensor as set forth in claim 33, the method further comprising:

a step of preparing a cover substrate, a cavity portion for weight body being provided on a lower surface of said cover substrate for forming a space within which the weight body is permitted to undergo displacement with a degree of freedom; and a step of joining the lower surface of the cover substrate to the fixed area of an upper surface of the body substrate so as to cover the weight body by a wall surface of said cavity portion for weight body.

35. A method of manufacturing a sensor as set forth in claim 33, the method further comprising:

a step of preparing a supporting substrate for being disposed in a manner opposite to the lower surface of the body substrate;

a step of implementing processing to either the lower surface of the body substrate or an upper surface of the supporting substrate, or both of the surfaces so that a cavity portion for one of said resistance elements can be formed between said working and flexible areas of the body substrate and an opposite area of the supporting substrate; and a step of joining the lower surface of the fixed area of the body substrate to the upper surface of the supporting substrate so as to form said cavity portion for said one of said resistance elements.

36. A method of manufacturing a sensor as set forth in claim 33:

wherein a substrate having three layer structure of an upper layer portion, a middle layer portion and a lower layer portion is used as the body substrate, and the middle layer portion is constituted by material having an etching characteristic different from that of the upper layer portion and the lower layer portion;

wherein grooves shallower than a thickness of the upper layer portion are dug as the grooves of the first depth; and wherein when the bottom portions of the grooves formed on the upper layer portion are dug to the second depth, two stages of a former stage and a latter stage are carried out so that the upper layer portion is dug by using first etching liquid or gas in the former stage and the middle layer portion is dug by using second etching liquid or gas in the latter stage.

37. A method of manufacturing a sensor as set forth in claim 36:

wherein the piezo resistance elements are to be provided in the lower layer portion and there is further provided a step of removing by etching a portion of an area where the piezo resistance elements are not formed of the lower layer portion so as to form a slit penetrated through the lower layer portion to allow the flexible portion to have sufficient flexibility in measurement.

38. A method of manufacturing a sensor as set forth in claim 36:

wherein the upper layer portion and the lower layer portion are constituted by silicon, the middle layer portion is constituted by silicon oxide and the piezo resistance elements are constituted by silicon having conductivity by addition of an impurity.

39. A method of manufacturing a sensor as set forth in claim 33:

wherein plural unit areas are defined on the first substrate or the body substrate, and a working area, a flexible area and a fixed area are defined for the respective unit areas, at a central portion of the unit area, at a periphery of the working area and at a periphery of the flexible area; and wherein individual steps are executed for the respective unit areas to form respectively independent sensor structural bodies in the respective unit areas thereafter to cut the substrates into the respective unit areas so as to manufacture plural independent sensors.

40. A manufacturing method for sensor as set forth in claim 39:

wherein when the grooves having the first depth are dug, grooves continuous over the plural unit areas are dug.

41. A method of manufacturing a sensor as set forth in claim 33:

wherein the grooves having the first depth are formed by mechanically digging the upper surface of the first substrate.

* * * * *